US010891496B2

(12) United States Patent
Sato et al.

(10) Patent No.: US 10,891,496 B2
(45) Date of Patent: Jan. 12, 2021

(54) INFORMATION PRESENTATION METHOD

(71) Applicant: MITSUBISHI ELECTRIC CORPORATION, Tokyo (JP)

(72) Inventors: Takumi Sato, Tokyo (JP); Yoshihiko Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 85 days.

(21) Appl. No.: 16/337,328

(22) PCT Filed: Nov. 1, 2016

(86) PCT No.: PCT/JP2016/082429
§ 371 (c)(1),
(2) Date: Mar. 27, 2019

(87) PCT Pub. No.: WO2018/083728
PCT Pub. Date: May 11, 2018

(65) Prior Publication Data
US 2020/0034635 A1     Jan. 30, 2020

(51) Int. Cl.
*G06K 9/00* (2006.01)
*B60W 40/06* (2012.01)
*B60W 40/09* (2012.01)
*G01C 21/26* (2006.01)
*G08G 1/09* (2006.01)

(52) U.S. Cl.
CPC ......... *G06K 9/00791* (2013.01); *B60W 40/06* (2013.01); *B60W 40/09* (2013.01); *G01C 21/26* (2013.01); *G08G 1/09* (2013.01)

(58) Field of Classification Search
CPC .. G06K 9/00791; B60W 40/06; B60W 40/09; G01C 21/26; G08G 1/09
See application file for complete search history.

(56) References Cited

U.S. PATENT DOCUMENTS

| 6,204,778 | B1 * | 3/2001 | Bergan | G08G 1/075 |
| | | | | 340/905 |
| 8,085,166 | B2 * | 12/2011 | Tamir | G08G 1/096791 |
| | | | | 340/901 |
| 9,495,874 | B1 * | 11/2016 | Zhu | B60W 30/09 |
| 2004/0101166 | A1 * | 5/2004 | Williams | G01P 3/38 |
| | | | | 382/104 |

(Continued)

FOREIGN PATENT DOCUMENTS

| JP | 2014-160408 A | 9/2014 |
| JP | 2015-191281 A | 11/2015 |

OTHER PUBLICATIONS

Google Scholar Search Results.*

*Primary Examiner* — Qun Shen
(74) *Attorney, Agent, or Firm* — Birch, Stewart, Kolasch & Birch, LLP

(57) ABSTRACT

A step of determining, by a presentation mode determining unit (205), a presentation mode different from a presentation mode of first road sign information, as a presentation mode of second road sign information, is included. This step is performed when a determination result indicates that traveling according to a road sign was not performed, the determination result being associated with a set of the first road sign information and first classification information that coincides with a set of the second road sign information and second classification information.

18 Claims, 17 Drawing Sheets

(56) References Cited

U.S. PATENT DOCUMENTS

| | | | |
|---|---|---|---|
| 2009/0074249 A1* | 3/2009 | Moed | G06K 9/00818 |
| | | | 382/104 |
| 2016/0012307 A1 | 1/2016 | Morishita | |
| 2017/0039434 A1* | 2/2017 | Shima | G08G 1/16 |
| 2017/0200061 A1* | 7/2017 | Julian | G06K 9/00791 |

* cited by examiner

FIG. 2

| | Classification Information | Presented Road Sign Information | Presentation Mode of Road Sign Information | Compliance Rate with Road Sign |
|---|---|---|---|---|
| No. 1 | Driver Speaks in Language Y | Stop | Display Road Sign | 65% |
| No. 2 | Driver Speaks in Language Y | Stop | Display Road Sign and Text Description in Language Y | 80% |
| No. 3 | Driver Speaks in Language Y | Stop | Display Road Sign, Output Voice in Language Y from Speaker | 90% |
| No. 4 | Driver Speaks in Language Y | Speed Limit: 60 km/h | Display Road Sign | 90% |
| No. 5 | Driver Speaks in Language Z | Stop | Display Road Sign | 75% |
| No. 6 | ... | ... | ... | ... |
| No. 7 | ... | ... | ... | ... |

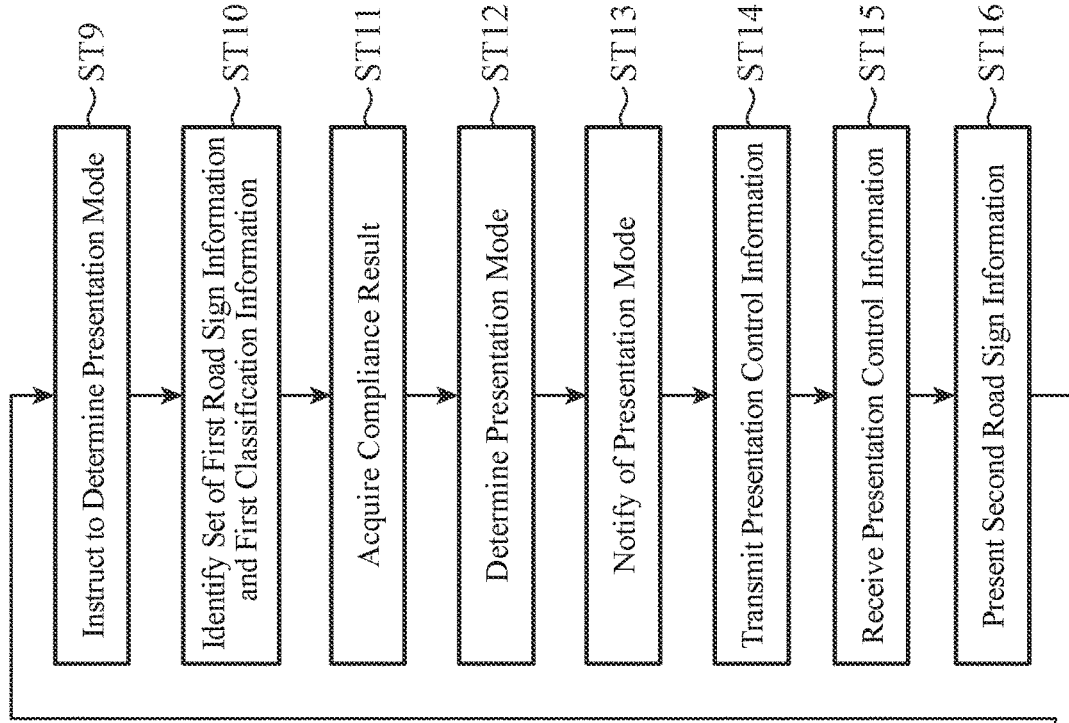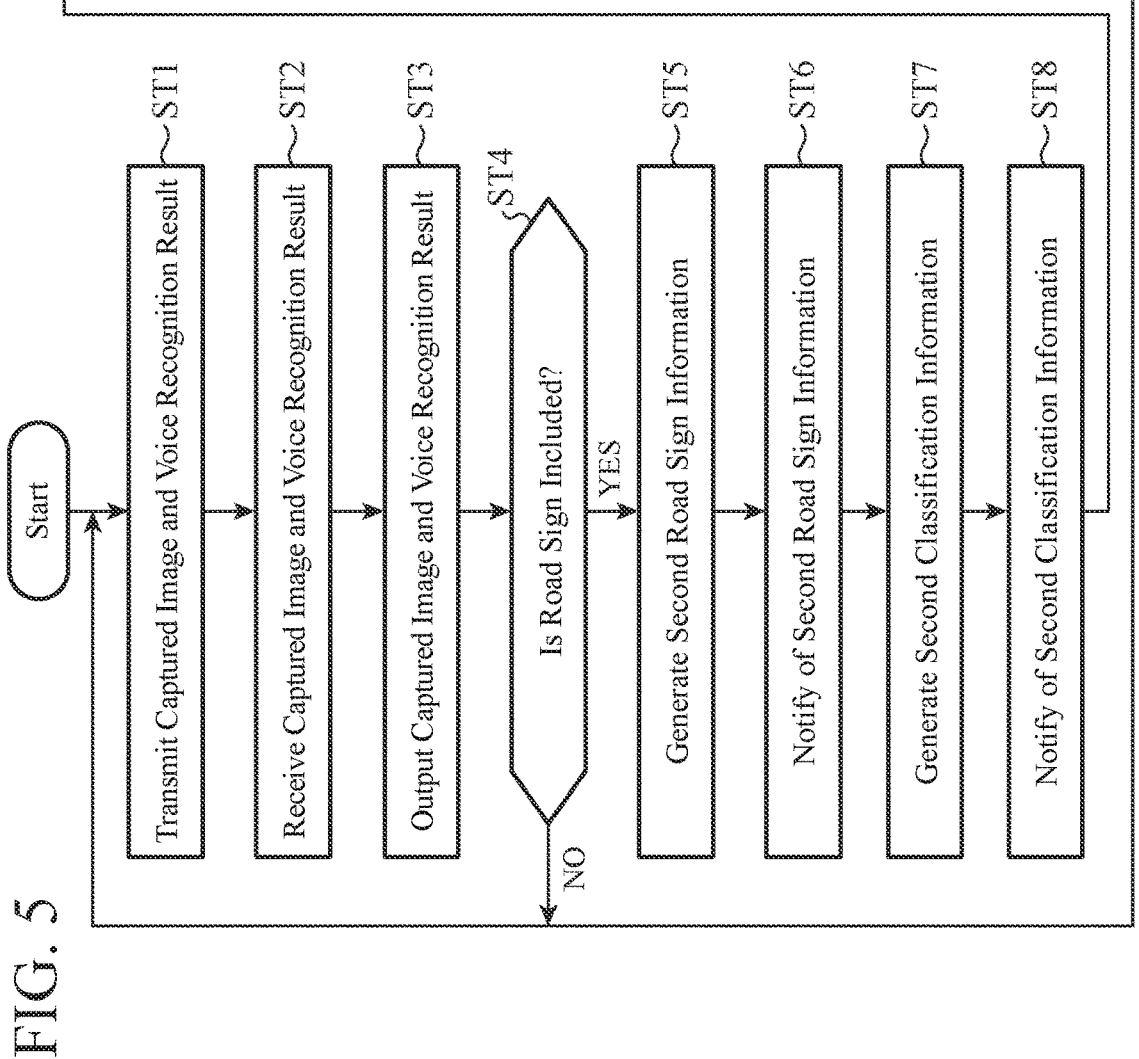
FIG. 5

| Presentation Level | Presentation Mode of Road Sign Information |
|---|---|
| Level 1 | Display Road Sign |
| Level 2 | Display Road Sign and Text Description |
| Level 3 | Display Road Sign, Output Voice from Speaker |
| Level 4 | Display Road Sign, Output Voice and Attention Information from Speaker |
| Level 5 | Display Road Sign, Output Voice and Alarm Sound from Speaker |

FIG. 9

|  | Classification Information | Presented Road Sign Information | Presentation Mode of Road Sign Information | Compliance Rate with Road Sign |
|---|---|---|---|---|
| No. 1 | Conversation: Absent | Stop | Display Road Sign | 95% |
| No. 2 | Conversation: Present | Stop | Display Road Sign | 75% |
| No. 3 | Conversation: Present | Stop | Display Road Sign, Output Voice from Speaker | 90% |
| No. 4 | Conversation: Absent | Speed Limit: 60 km/h | Display Road Sign | 95% |
| No. 5 | Conversation: Present | Speed Limit: 60 km/h | Display Road Sign | 80% |
| No. 6 | ... | ... | ... | ... |
| No. 7 | ... | ... | ... | ... |

FIG. 11A

| Presented Road Sign Information | Presentation Mode of Road Sign Information When Driver Shows Discomfort (Presentation Level) | Rate at Which Driver Shows Discomfort |
|---|---|---|
| Stop | Display Road Sign, Output Voice from Speaker (Level 3) | 30% |
| Stop | Display Road Sign, Output Voice and Alarm Sound from Speaker (Level 5) | 45% |
| ... | ... | ... |
| ... | ... | ... |

FIG. 11B

| Vehicle ID | Presented Road Sign Information | Presentation Mode of Road Sign Information When Driver Shows Discomfort (Presentation Level) |
|---|---|---|
| 1011 | Stop | Display Road Sign, Output Voice from Speaker (Level 3) |
| 1041 | Speed Limit: 60 km/h | Display Road Sign, Output Voice and Alarm Sound from Speaker (Level 5) |
| 2003 | Stop | Display Road Sign, Output Voice from Speaker (Level 3) |
| ... | ... | ... |
| ... | ... | ... |

FIG. 14

| | Classification Information | Presented Road Sign Information | Presentation Mode of Road Sign Information | Compliance Rate with Road Sign |
|---|---|---|---|---|
| No. 1 | View Left Side with Respect to Traveling Direction ahead of Vehicle | Stop | Display Road Sign on Main Display | 80% |
| No. 2 | View Left Side with Respect to Traveling Direction ahead of Vehicle | Stop | Display on Display Located in Viewing Direction | 90% |
| No. 3 | ... | ... | ... | ... |
| No. 4 | ... | ... | ... | ... |

FIG. 17

| | Classification Information | Presented Road Sign Information | Presentation Mode of Road Sign Information | Compliance Rate with Road Sign |
|---|---|---|---|---|
| No. 1 | Driving Skill Level: Low | Stop | Display Road Sign | 70% |
| No. 2 | Driving Skill Level: Low | Stop | Display Road Sign, Output Voice from Speaker | 90% |
| No. 3 | Driving Skill Level: Low | Stop | Display Road Sign, Output Voice and Alarm Sound from Speaker | 98% |
| No. 4 | Driving Skill Level: High | Stop | Display Road Sign | 95% |
| No. 5 | ... | ... | ... | ... |
| No. 6 | ... | ... | ... | ... |

INFORMATION PRESENTATION METHOD

TECHNICAL FIELD

The present invention relates to a technique for notifying an occupant of a vehicle of information on road signs captured by a camera.

BACKGROUND ART

Conventionally, there is a technique for displaying information on road signs captured by a camera on a display unit in a vehicle. Such a technique is provided because, even when a navigation device is mounted on the vehicle, not all information on road signs installed on roads is provided as map information of the navigation device.

For example, Patent Literature 1 discloses a road sign display device in which template matching is executed on a captured image outside a vehicle captured by a camera and a similarity score is obtained for each reference template, and when it is determined that the difference is sufficiently large between the maximum similarity score and each of the second and following similarity scores, an icon image of the road sign corresponding to the reference template acquiring the maximum similarity score is displayed on a display unit. In addition, in the road sign display device disclosed in Patent Literature 1, in addition to displaying an icon image on the display unit, it is also disclosed to perform notification by voice corresponding to the icon image (for example, "the speed limit is 40 km/h").

CITATION LIST

Patent Literature

Patent Literature 1: JP 2015-191281 A

SUMMARY OF INVENTION

Technical Problem

However, with the technique described in the above Patent Literature 1, there has been a problem that it is impossible to present information on road signs in accordance with states of a driver. There has been a case, for example, in which excessive notification is presented to a driver who can recognize road signs with high skills and annoys the driver, or only icon image of a road sign is presented and the meaning of the road sign cannot be recognized by a driver since the driver is a foreigner or a beginner. Namely, there has been a problem that it is difficult to present an appropriate amount of information on road signs for each driver.

The present invention is made to solve the above problems, and it is an object of the invention to present an appropriate amount of information on road signs in accordance with states of a driver.

Solution to Problem

An information presentation method according to the present invention includes: receiving a captured image of a road sign captured from a first vehicle and information indicating a vehicle situation of the first vehicle; generating first road sign information by recognizing the road sign included in the captured image; generating first classification information with reference to the information indicating the vehicle situation of the first vehicle; determining a presentation mode of the first road sign information, on a basis of the first road sign information and the first classification information; performing control to present the first road sign information in the presentation mode determined in the determining; performing determination whether or not the first vehicle performed traveling in compliance with the road sign, and accumulating a determination result of the determination, the first road sign information, the first classification information, and the presentation mode of the first road sign information in association with each other; receiving a captured image of a road sign captured from a second vehicle succeeding the first vehicle in time series and information indicating a vehicle situation of the second vehicle; generating second road sign information by recognizing the road sign included in the captured image captured from the second vehicle; generating second classification information with reference to the information indicating the vehicle situation of the second vehicle; determining, a presentation mode different from the presentation mode of the first road sign information, as a presentation mode of the second road sign information, when the determination result indicates that traveling in compliance with the road sign was not performed, the determination result being associated with a set of the first road sign information and the first classification information that coincides with a set of the second road sign information and the second classification information; and performing control to present the second road sign information in the determined presentation mode of the second road sign information.

Advantageous Effects of Invention

According to the present invention, it is possible to present an appropriate amount of road sign information in accordance with states of a driver.

BRIEF DESCRIPTION OF DRAWINGS

FIG. 2 is a diagram illustrating an accumulation example in an accumulating unit of a server device for implementing the information presentation method according to the first embodiment;

FIG. 5 is a flowchart illustrating operation of presentation processing of road sign information of the information presentation system for implementing the information presentation method according to the first embodiment;

FIG. 9 is a diagram illustrating an accumulation example in an accumulating unit of a server device for implementing an information presentation method according to a second embodiment;

FIGS. 11A and 11B are diagrams each illustrating an accumulation example in a reaction information accumulating unit of a server device for implementing the information presentation method according to the third embodiment;

FIG. 14 is a diagram illustrating an accumulation example in an accumulating unit of a server device for implementing the information presentation method according to the fourth embodiment;

FIG. 17 is a diagram illustrating an accumulation example in an accumulating unit of a server device for implementing the information presentation method according to the fifth embodiment.

DESCRIPTION OF EMBODIMENTS

Hereinafter, for explaining the present invention in more detail, some embodiments for carrying out the present invention will be described with reference to the accompanying drawings.

First Embodiment

Figure 1:
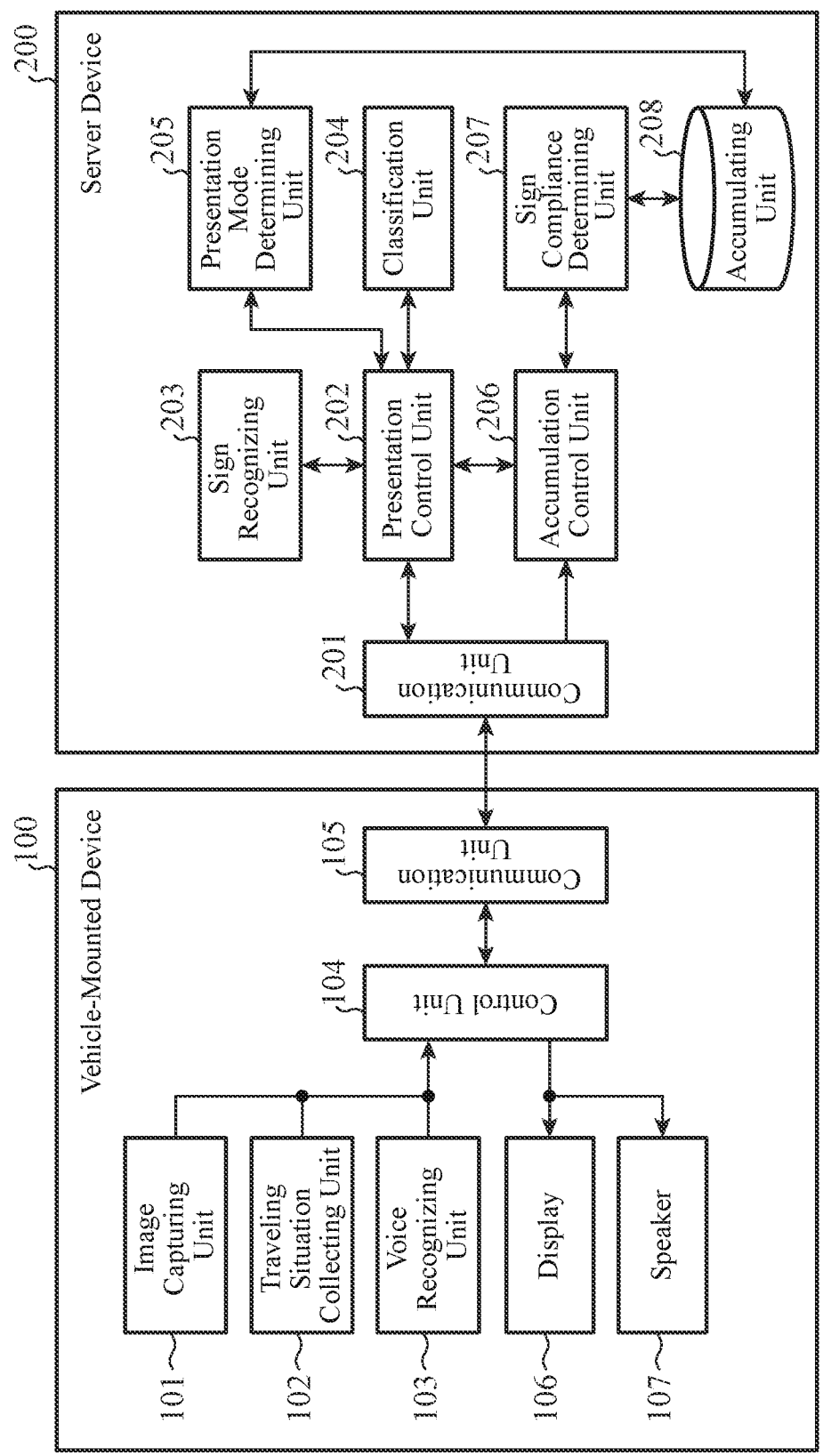
FIG. 1 is a block diagram illustrating a configuration of an information presentation system for implementing an information presentation method according to a first embodiment.

FIG. 1 is a block diagram illustrating a configuration of an information presentation system for implementing an information presentation method according to a first embodiment.

The information presentation system includes a vehicle-mounted device 100 and a server device 200. In the example of FIG. 1, a case is illustrated where one vehicle-mounted device 100 is connected to the server device 200; however, in actual use of the information presentation system, it is assumed that a plurality of the vehicle-mounted devices 100 is connected to the server device 200.

The vehicle-mounted device 100 includes an image capturing unit 101, a traveling situation collecting unit 102, a voice recognizing unit 103, a control unit 104, a communication unit 105, a display 106, and a speaker 107.

The image capturing unit 101 includes, for example, a camera or the like, and captures an image of the road ahead of a host vehicle mounting the vehicle-mounted device 100. The traveling situation collecting unit 102 collects information indicating a traveling situation of the host vehicle. The traveling situation collecting unit 102 collects, for example, current position information of the host vehicle, a traveling speed, a steering wheel angle, a steering wheel operation state, a brake operation state, and the like, as information indicating the traveling situation of the host vehicle. The voice recognizing unit 103 performs voice recognition processing on voice information indicating voice such as conversation of occupants of the host vehicle collected by a microphone (not illustrated) or the like installed in the vehicle. It is assumed that the voice recognition processing of the voice recognizing unit 103 supports a plurality of languages. The voice recognizing unit 103 may perform voice recognition processing on the voice information of conversation of all occupants of the host vehicle, or may perform voice recognition processing only for limited occupants, for example, perform voice recognition processing only on voice information of conversation of occupants sitting on the driver's seat and the assistant driver's seat of the host vehicle.

The control unit 104 performs control for transmitting a captured image acquired by the image capturing unit 101, information indicating the traveling situation collected by the traveling situation collecting unit 102, and a voice recognition result of the voice recognizing unit 103 to the server device 200 via the communication unit 105. In addition, the control unit 104 acquires control information transmitted from the server device 200 via the communication unit 105. The control unit 104 performs control for displaying information on the display 106 and outputting the information by voice from the speaker 107 in response to the acquired control information.

The communication unit 105 performs wireless communication with a communication unit 201 of the server device 200 mutually. The display 106 displays information transmitted from the server device 200 in response to a control instruction of the control unit 104. The speaker 107 outputs the information transmitted from the server device 200 by voice in response to a control instruction of the control unit 104.

The server device 200 includes the communication unit 201, a presentation control unit 202, a sign recognizing unit 203, a classification unit 204, a presentation mode determining unit 205, an accumulation control unit 206, a sign compliance determining unit 207, and an accumulating unit 208. The vehicle-mounted device 100 connected to the server device 200 is mounted in each of a plurality of vehicles. Note that, in the present invention, a vehicle preceding in time series is referred to as a first vehicle, and a vehicle succeeding the first vehicle in time series is referred to as a second vehicle. That is, the second vehicle is treated as the first vehicle in the next processing. Further, each of the first vehicle and the second vehicle do not necessarily mean a particular specific vehicle. A plurality of the first vehicles may exist. In addition, the second vehicle mounts the vehicle-mounted device 100 that is a target for presenting road sign information in certain presentation processing.

Note that, in the following description, the server device 200 performs similar processing for the first vehicle and the second vehicle basically. In the present invention, it is confirmed whether or not there has previously been a vehicle situation that is the same as a current vehicle situation, and when the vehicle does not travel in compliance with road sign information under that vehicle situation, road sign information is presented in a mode different from the previous one. This processing will be described in detail below.

The communication unit 201 performs wireless communication with the communication unit 105 of the vehicle-mounted device 100 mutually. The presentation control unit 202 outputs the captured image and information indicating the vehicle situation, which are transmitted from the vehicle-mounted device 100, to the sign recognizing unit 203, the classification unit 204, and the presentation mode determining unit 205, and performs control for generating road sign information. In addition, the presentation control unit 202 performs control for outputting the generated road sign information to the vehicle-mounted device 100. The sign recognizing unit 203 analyzes the captured image input from the presentation control unit 202, and when the captured image includes a road sign, performs recognition of the road sign and generates the road sign information. The sign recognizing unit 203 outputs the generated road sign information to the presentation control unit 202.

The classification unit 204 refers to the information indicating the vehicle situation input from the presentation control unit 202, and classifies the vehicle situation. In the first embodiment, the classification unit 204 performs classification on the basis of the information indicating the vehicle situation, thereby generating classification information.

Here, the vehicle situation is a scene identified by the information indicating the vehicle situation such as information indicating a traveling situation or occupant information. In addition, the classification information is a result of classifying the vehicle situation. The classification information indicates whether the vehicle situations of vehicles are the same as each other or not. Note that, "the vehicle situations are the same as each other" means that the vehicle situations are the same as each other when they are seen from a certain point of view.

The information indicating the traveling situation is information such as traveling history information, current position information, traveling speed, vehicle operation information (steering wheel angle, steering wheel operation state, brake operation state, and the like).

In addition, the occupant information is obtained from, for example, a device installed in the vehicle, and indicates, for example, the language used by an occupant, age, sex, and the like of the occupant. In addition, the occupant information may also be acquired from the vehicle operation information. For example, information indicating a driving skill level of the driver or information indicating whether the driver is in a hurry is acquired from vehicle operation information such as whether there are a lot of abrupt acceleration/deceleration.

The traveling history information is information also used for determining whether or not a user traveled in compliance with a road sign.

The classification unit 204 outputs the classification information generated on the basis of the information indicating the vehicle situation described above to the presentation control unit 202.

The presentation mode determining unit 205 refers to the information accumulated in the accumulating unit 208 (details will be described later), and identifies a set of first road sign information and first classification information that coincides with a set of second road sign information and second classification information. The presentation mode determining unit 205 refers to a compliance result associated with the identified set of the first road sign information and the first classification information, and determines a presentation mode of the second road sign information. Here, when a rate of the first vehicle traveling in compliance with the road sign is less than a threshold value, the presentation mode determining unit 205 changes the presentation mode of the second road sign information to a presentation mode different from a presentation mode of the first road sign information.

That is, in a case where the first vehicle preceding in time series does not travel in compliance with the road sign, when the presentation mode determining unit 205 also determines the same presentation mode for the second vehicle succeeding in time series in consideration of the first classification information, the driver of the second vehicle may inadvertently fail to travel in compliance with the road sign similarly to the first vehicle. Thus, the presentation mode determining unit 205 changes the presentation mode for the second vehicle to a presentation mode different from that of the first vehicle.

The presentation control unit 202 transmits the second road sign information generated by the sign recognizing unit 203 and the presentation mode of the second road sign information determined by the presentation mode determining unit 205 to the vehicle-mounted device 100 via the communication unit 201.

Although not described in the above, the communication unit 201, the presentation control unit 202, the sign recognizing unit 203, the classification unit 204, and the presentation mode determining unit 205 perform similar processing also for the first vehicle. As a result, the first road sign information, the first classification information, and a presentation result of the first road sign information corresponding to the first vehicle are obtained. Such a processing is performed also in other embodiments.

The accumulation control unit 206 outputs the captured image of the image capturing unit 101 of the vehicle-mounted device 100 of the first vehicle to which the first road sign information is presented, and information indicating the traveling situation (vehicle operation information, traveling history information, and the like) collected by the traveling situation collecting unit 102 of the same vehicle-mounted device 100 to the sign compliance determining unit 207, and performs control for accumulating compliance results of road signs.

The sign compliance determining unit 207 determines whether or not the first vehicle performed traveling in compliance with the road sign on the basis of the captured image and the information indicating the traveling situation. The sign compliance determining unit 207 accumulates a determination result, the first classification information, the first road sign information that was presented when the determination result was obtained, and the presentation mode of the first road sign information in the accumulating unit 208. Note that, the sign compliance determining unit 207 may acquire the first road sign information and the presentation mode of the first road sign information from the vehicle-mounted device 100 side, or may acquire them from the presentation control unit 202 of the server device 200.

The accumulating unit 208 accumulates information on the vehicle.

FIG. 2 is a diagram illustrating an accumulation example in the accumulating unit 208 of the information presentation system for implementing the information presentation method according to the first embodiment.

The accumulating unit 208 accumulates information including, for example, classification information, presented road sign information, a presentation mode of the road sign information, a compliance rate with respect to the road sign, and the like.

In the example of FIG. 2, information of No. 1 indicates that the classification information is "Driver Speaks in Language Y", the presented road sign information is "Stop", the presentation mode of the road sign information is "Display Road Sign on Display", and the compliance rate with respect to the road sign is "65%".

Information of No. 3 indicates that the classification information is "Driver Speaks in Language Y", the presented road sign information is "Stop", the presentation mode of the road sign information is "Display Road Sign on Display, and Output Voice from Speaker", and the compliance rate with respect to the road sign is "90%".

Comparing the information of No. 1 with the information of No. 3, it is indicated that, when the driver speaks in language Y, by presenting information on the display 106 and outputting voice by the speaker 107, the road sign information can be effectively presented to the driver. The presentation mode determining unit 205 can effectively present the road sign information to the driver by referring to the compliance results as illustrated in FIG. 2.

Next, a hardware configuration example of the vehicle-mounted device 100 will be described.

Figure 3A:
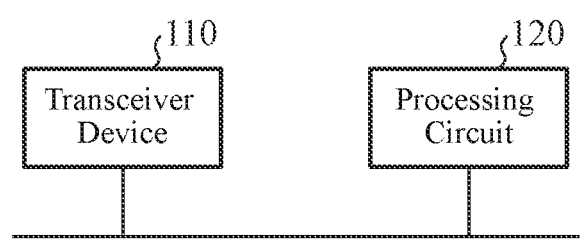
FIGS. 3A and 3B are diagrams each illustrating a hardware configuration example of a vehicle-mounted device for implementing the information presentation method according to the first embodiment.
Figure 3B:
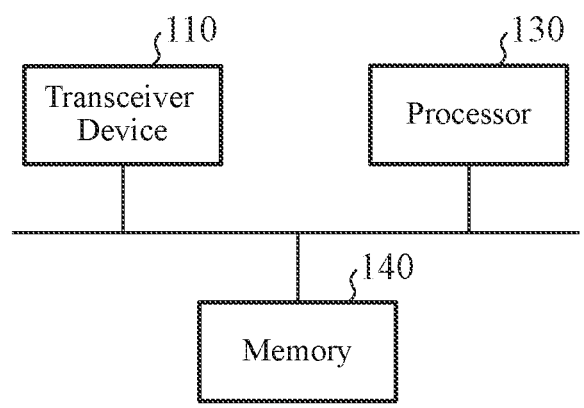

FIGS. 3A and 3B are diagrams each illustrating the hardware configuration example of the vehicle-mounted device 100 for implementing the information presentation method according to the first embodiment.

The communication unit 105 in the vehicle-mounted device 100 is a transceiver device 110 for performing wireless communication between the vehicle-mounted device 100 and the server device 200. The traveling situation collecting unit 102, the voice recognizing unit 103, and the control unit 104 in the vehicle-mounted device 100 each may be a processing circuit 120 that is dedicated hardware as illustrated in FIG. 3A, or may be a processor 130 for executing a program stored in a memory 140 as illustrated FIG. 3B.

As illustrated in FIG. 3A, when the traveling situation collecting unit 102, the voice recognizing unit 103, and the control unit 104 are dedicated hardware, the processing circuit 120 is implemented as, for example, a single circuit, a composite circuit, a programmed processor, a parallel-programmed processor, an application specific integrated circuit (ASIC), a field-programmable gate array (FPGA), or a combination thereof. The functions of the traveling situation collecting unit 102, the voice recognizing unit 103, and the control unit 104 may be implemented by the respective processing circuits, or the functions of the respective units may be collectively implemented by one processing circuit.

Figures 7, 8:
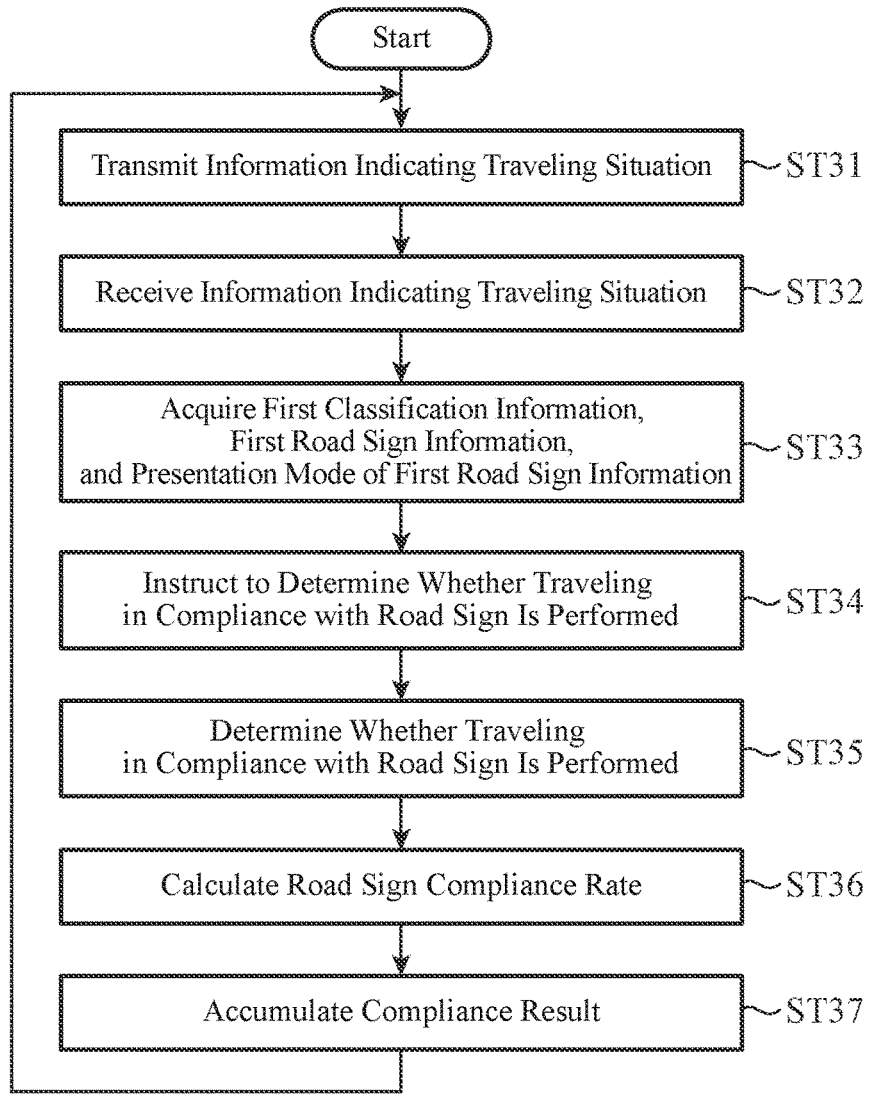
FIG. 7 is a flowchart illustrating accumulation processing of a compliance result of the information presentation system for implementing the information presentation method according to the first embodiment.
FIG. 8 is a diagram illustrating an example of a presentation mode set in the presentation mode determining unit of the server device for implementing the information presentation method according to the first embodiment.

As illustrated in FIG. 3B, when the traveling situation collecting unit 102, the voice recognizing unit 103, and the control unit 104 are implemented by the processor 130, the functions of the respective units are implemented by software, firmware, or a combination of software and firmware. The software or the firmware is described as a program and stored in the memory 140. The processor 130 reads and executes the program stored in the memory 140, thereby implementing the functions of the traveling situation collecting unit 102, the voice recognizing unit 103, and the control unit 104. That is, the traveling situation collecting unit 102, the voice recognizing unit 103, and the control unit 104 include the memory 140 for storing programs by which each step illustrated in FIGS. 5 and 7 is resultantly executed when the programs are executed by the processor 130. In addition, it can also be said that the programs cause a computer to execute procedures or methods of the traveling situation collecting unit 102, the voice recognizing unit 103, and the control unit 104.

Here, the processor 130 is, for example, a central processing unit (CPU), a processing device, an arithmetic device, a processor, a microprocessor, a microcomputer, a digital signal processor (DSP), or the like.

For example, the memory 140 may be a nonvolatile or volatile semiconductor memory such as a random access memory (RAM), a read only memory (ROM), a flash memory, an erasable programmable ROM (EPROM), or an electrically EPROM (EEPROM), may be a magnetic disk such as a hard disk or a flexible disk, or may be an optical disc such as a mini disc, a compact disc (CD), or a digital versatile disc (DVD).

Note that, the functions of the traveling situation collecting unit 102, the voice recognizing unit 103, and the control unit 104 may be partially implemented by dedicated hardware and partially implemented by software or firmware. As described above, the processing circuit 120 in the vehicle-mounted device 100 can implement the above-described functions by hardware, software, firmware, or a combination thereof.

Next, a hardware configuration example of the server device 200 will be described.

Figure 4A:
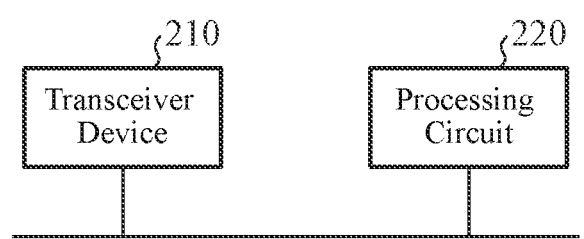
FIGS. 4A and 4B are diagrams each illustrating a hardware configuration example of the server device for implementing the information presentation method according to the first embodiment.
Figure 4B:
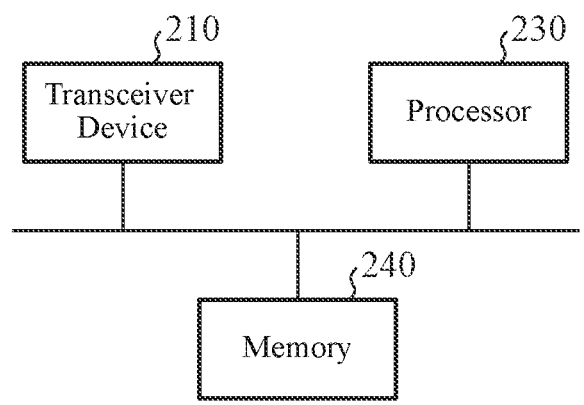

FIGS. 4A and 4B are diagrams each illustrating a hardware configuration example of the server device 200 for implementing the information presentation method according to the first embodiment.

The communication unit 201 in the server device 200 is a transceiver device 210 for performing wireless communication between the vehicle-mounted device 100 and the server device 200. The presentation control unit 202, the sign recognizing unit 203, the classification unit 204, the presentation mode determining unit 205, the accumulation control unit 206, and the sign compliance determining unit 207 in the server device 200 each may be a processing circuit 220 that is dedicated hardware as illustrated in FIG. 4A, or may be a processor 230 for executing a program stored in a memory 240 as illustrated in FIG. 4B.

When the processing circuit 220 is dedicated hardware as illustrated in FIG. 4A, the processing circuit 220 is implemented as, for example, a single circuit, a composite circuit, a programmed processor, a parallel-programmed processor, an ASIC, an FPGA, or a combination thereof.

In addition, when the processing circuit 220 is implemented by the processor 230 as illustrated in FIG. 4B, a function of the processing circuit 220 is implemented by software, firmware, or a combination of software and firmware. The software or the firmware is described as a program and stored in the memory 240. The processor 230 reads and executes the program stored in the memory 240, thereby implementing the function of the processing circuit 220. That is, the processing circuit 220 includes the memory 240 for storing a program by which each step illustrated in FIGS. 5, 6, and 7 described later is resultantly executed when the program is executed by the processor 230. In addition, it can also be said that the program causes a computer to execute a procedure or a method of the processing circuit 220.

Note that, the function of the processing circuit 220 may be partially implemented by dedicated hardware and partially implemented by software or firmware. As described above, the processing circuit 220 in the server device 200 can implement the above-described function by hardware, software, firmware, or a combination thereof.

Next, operation of the information presentation system will be described.

FIG. 5 is a flowchart illustrating operation of presentation processing of road sign information of the information presentation system for implementing the information presentation method according to the first embodiment. Since processing for presenting sign information to the vehicle-mounted device 100 is common to the case of the first vehicle and the case of the second vehicle, hereinafter, as an example, processing for presenting sign information to the vehicle-mounted device 100 of the second vehicle will be described.

Note that, hereinafter, description will be made assuming that the image capturing unit 101 of the vehicle-mounted device 100 mounted on the second vehicle constantly acquires capture images, the traveling situation collecting unit 102 constantly collects information indicating the traveling situation of the host vehicle, and the voice recognizing unit 103 constantly collects conversation inside the host vehicle and acquires voice recognition results.

The control unit 104 of the vehicle-mounted device 100 acquires a captured image of the image capturing unit 101, information indicating the traveling situation of the traveling situation collecting unit 102, and a voice recognition result of the voice recognizing unit 103 as occupant information, and transmits them to the server device 200 via the communication unit 105 (step ST1). The communication unit 201 of the server device 200 receives the captured image and the voice recognition result transmitted from the vehicle-mounted device 100, and outputs them to the presentation control unit 202 (step ST2). The presentation control unit 202 outputs the captured image input in step ST2 to the sign recognizing unit 203, and outputs the voice recognition result to the classification unit 204 (step ST3). The sign recognizing unit 203 analyzes the captured image input in step ST3, and determines whether or not a road sign is included in the captured image (step ST4). When no road sign is included (step ST4; NO), the processing of the flow returns to the processing in step ST1.

On the other hand, when a road sign is included (step ST4; YES), the sign recognizing unit 203 performs recognition of the road sign and generates second road sign information (step ST5). The second road sign information generated by the sign recognizing unit 203 includes an image indicating the road sign, information indicating a traffic rule indicated by the road sign, and the like. The sign recognizing unit 203 notifies the presentation control unit 202 of the second road sign information generated in step ST5 (step ST6). The classification unit 204 classifies a situation of the vehicle on the basis of the voice recognition result input in step ST3, thereby generating second classification information (step ST7).

For example, the classification unit 204 generates language information by identifying the language used in conversation by occupants. The language information generated by the classification unit 204 indicates the language used by occupants of the vehicle for conversation. The classification unit 204 notifies the presentation control unit 202 of the second classification information generated in step ST8 (step ST8). Note that, the processing in step ST7 and step ST8 may be executed in parallel with the processing from step ST4 to step ST6.

The presentation control unit 202 outputs the second road sign information notified by the sign recognizing unit 203 and the second classification information notified by the classification unit 204 to the presentation mode determining unit 205, and instructs the presentation mode determining unit 205 to determine a presentation mode of the second road sign information (step ST9). The presentation mode determining unit 205 refers to the accumulating unit 208 and identifies a set of first road sign information and first classification information that coincides with a set of the second road sign information and the second classification information input from the presentation control unit 202 (step ST10). The presentation mode determining unit 205 refers to the accumulating unit 208, and acquires a compliance result associated with the identified set of the first road sign information and the first classification information (step ST11).

For example, the presentation mode determining unit 205 acquires, from the accumulating unit 208, a compliance result at the time when the first road sign information is presented to a driver of the first vehicle who makes conversation in the language indicated in the language information input from the presentation control unit 202.

The presentation mode determining unit 205 determines the presentation mode of the second road sign information input from the presentation control unit 202 on the basis of the compliance result acquired in step ST11 (step ST12). The presentation mode determining unit 205 notifies the presentation control unit 202 of the determined presentation mode (step ST13).

The presentation control unit 202 transmits control information for presenting the second road sign information in the presentation mode determined by the presentation mode determining unit 205 to the vehicle-mounted device 100 via the communication unit 201 (step ST14). The communication unit 105 of the vehicle-mounted device 100 receives the control information transmitted from the server device 200, and outputs the control information to the control unit 104 (step ST15). On the basis of the control information input in step ST15, the control unit 104 performs processing for presenting the second road sign information to the driver via the display 106, or the display 106 and the speaker 107 (step ST16). Thereafter, the processing of the flowchart returns to the processing in step ST1, and the above-described processing is repeated.

Figure 6:
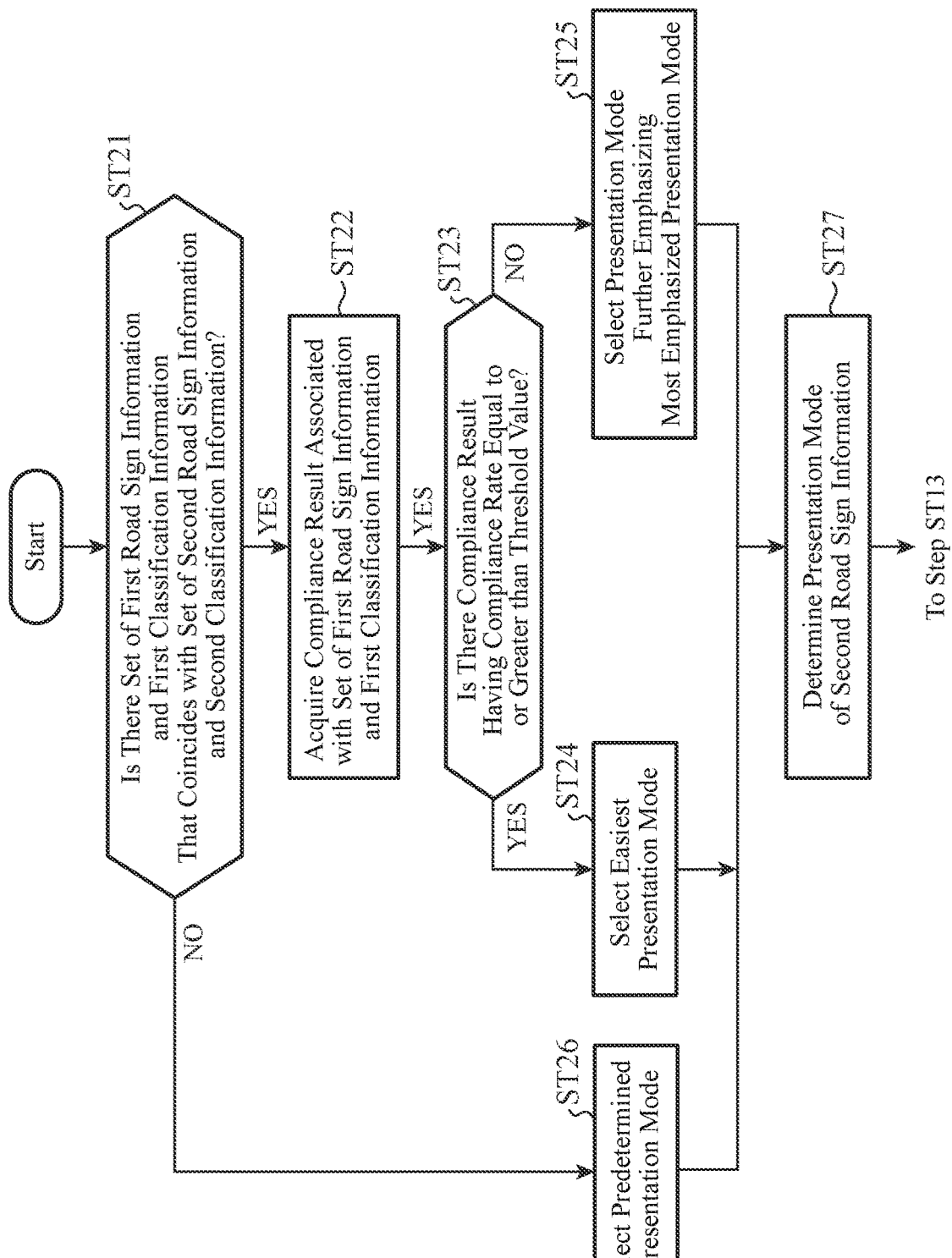
FIG. 6 is a flowchart illustrating operation of a presentation mode determining unit of the server device for implementing the information presentation method according to the first embodiment.

The processing from step ST10 to step ST12 in the flowchart illustrated in FIG. 5 will be described in more detail. FIG. 6 is a flowchart illustrating operation of the presentation mode determining unit 205 of the server device 200 of the information presentation system for implementing the information presentation method according to the first embodiment. In the flowchart of FIG. 6, description will be made assuming that the classification information is language information.

The presentation mode determining unit 205 refers to compliance results accumulated in the accumulating unit 208, and determines whether or not there is a set of the first road sign information and the first classification information in which the same road sign information as the second road sign information input from the presentation control unit 202 is presented and that is spoken in the same language as the language indicated in the second classification information (language information) input from the presentation control unit 202 (step ST21).

When there is such a set of the first road sign information and the first classification information (step ST21; YES), the presentation mode determining unit 205 acquires a compliance result associated with the set of the first road sign information and the first classification information (step ST22). The presentation mode determining unit 205 refers to a compliance rate with respect to the road sign of the acquired compliance result, and determines whether or not there is a compliance result having a compliance rate equal to or greater than the threshold value (step ST23).

When there is a compliance result whose compliance rate is equal to or greater than the threshold value (step ST23; YES), the presentation mode determining unit 205 selects the easiest presentation mode among presentation modes of road sign information of the compliance result whose compliance rates are equal to or greater than the threshold value (step ST24). The presentation mode determining unit 205 determines whether or not the presentation mode is easy on the basis of, for example, the number of output destination devices. When there are a presentation mode for performing only display on the display 106 (number of devices: 1), and a presentation mode for performing display on the display 106 and voice output to the speaker 107 (number of devices: 2), the presentation mode determining unit 205 determines that performing only displaying on the display 106 is an easier presentation mode. On the other hand, when there is no compliance result whose compliance rate is equal to or greater than the threshold value (step ST23; NO), the presentation mode determining unit 205 selects a presentation mode further emphasizing the most emphasized presentation mode among presentation modes of compliance results presenting the same road sign information (step ST25).

When there is no such set of the first road sign information and the first classification information (step ST21; NO), the presentation mode determining unit 205 selects a predetermined presentation mode (step ST26). The presentation mode determining unit 205 determines the presentation mode selected in step ST24, step ST25, or step ST26 as a presentation mode for presenting the second road sign information (step ST27). Thereafter, the processing of the flowchart proceeds to the processing in step ST13 of the flowchart of FIG. 5.

Next, processing will be described for accumulating, in the server device 200, a compliance result indicating whether or not a vehicle mounting the vehicle-mounted device 100 traveled in compliance with the presented road sign information.

FIG. 7 is a flowchart illustrating accumulation processing of a compliance result of the information presentation system for implementing the information presentation method according to the first embodiment. Hereinafter, as an example, processing will be described for accumulating a compliance result whether or not the first vehicle that mounts the vehicle-mounted device 100 and to which the first road sign information is presented traveled in compliance with the road sign information.

The control unit 104 of the vehicle-mounted device 100 acquires information indicating the traveling situation of the traveling situation collecting unit 102, and transmits the information to the server device 200 via the communication unit 105 (step ST31). The processing in step ST31 is executed after the first road sign information is presented in the vehicle-mounted device 100, and the control unit 104 transmits information indicating the traveling situation of the host vehicle for a predetermined period after the time when the first road sign information is presented. Here, the predetermined period is a period that can be appropriately set. For example, the control unit 104 acquires information indicating the traveling situation from a time after 0 second from the time of performing the control for presenting the first road sign information and for 15 seconds.

The communication unit 201 of the server device 200 receives information indicating the traveling situation of the first vehicle transmitted from the vehicle-mounted device 100, and outputs the received information indicating the traveling situation to the accumulation control unit 206 (step ST32). When the information indicating the traveling situation of the first vehicle is input in step ST32, the accumulation control unit 206 acquires, from the presentation control unit 202, the most recent information including the first classification information, the first road sign information, and the presentation mode of the first road sign information regarding the first vehicle corresponding to the vehicle-mounted device 100 (step ST33). The accumulation control unit 206 outputs, to the sign compliance determining unit 207, the information acquired in step ST33 and the information indicating the traveling situation in association with each other, and instructs the sign compliance determining unit 207 to determine whether or not traveling in compliance with the road sign is performed (step ST34).

The sign compliance determining unit 207 compares a traveling state of the first vehicle with the first road sign information presented to the driver, and determines whether or not the traveling in compliance with the road sign is performed (step ST35). The sign compliance determining unit 207 refers to the determination result in step ST35 and the past compliance result accumulated in the accumulating unit 208, and calculates the compliance rate with respect to the road sign (step ST36). The sign compliance determining unit 207 accumulates the compliance rate calculated in step ST36, the first classification information, the first road sign information, and the presentation mode of the first road sign information, as the compliance result in the accumulating unit 208 (step ST37).

In the accumulation processing in step ST37, in a case where the compliance rate when the same road sign information in the same classification information is presented in the same presentation mode has already been accumulated in the accumulating unit 208, only update of the compliance rate is performed. On the other hand, in a case where the same classification information, the same road sign information, or the same information on the presentation mode of the road sign information is not accumulated in the accumulating unit 208, a new compliance result is created. Thereafter, the processing of the flowchart returns to the processing in step ST31, and the same processing is repeated.

Next, with reference to the flowchart illustrated in FIG. 6, a specific example will be described.

Hereinafter, it is assumed that a second vehicle A travels in a country x with a language X as its official language, passes in front of a "stop" road sign, and the sign recognizing unit 203 generates second road sign information indicating "stop". Further, it is assumed that a driver who speaks in language Y and a passenger who speaks in language Y ride on the second vehicle A, and the classification unit 204 generates second classification information that is language information indicating that the driver speaks in language Y. In addition, it is assumed that the compliance results illustrated in FIG. 2 are accumulated in the accumulating unit 208. Moreover, it is assumed that the threshold value of the compliance rate at the time of determination of the presentation mode of the second road sign information is set to be equal to or greater than 75% in the presentation mode determining unit 205.

In step ST21 of the flowchart of FIG. 6, the presentation mode determining unit 205 determines, on the basis of the information in the accumulating unit 208 accumulating the compliance results illustrated in FIG. 2, that there is a set of the first classification information indicating that the driver speaks in language Y and the first road sign information indicating "stop" (information of No. 1 to No. 3) (step ST21; YES). In step ST22, the presentation mode determining unit 205 acquires the compliance results of No. 1 to No. 3. In step ST23, the presentation mode determining unit 205 determines that there are compliance results (information of No. 2 and No. 3) having a compliance rate of equal to or greater than 75% (step ST23; YES).

In step ST24, the presentation mode determining unit 205 compares the presentation mode of information of No. 2 with the presentation mode of the information of No. 3, and determines that the presentation mode in which the presentation is performed only on the display 106 is easier, and selects the presentation mode of the information of No. 2. In step ST27, the presentation mode determining unit 205 determines "display the road sign and the text description in language Y on the display" that is the presentation mode of the road sign information of the information of No. 2, as the presentation mode for presenting the second road sign information.

In step ST23, when there is no compliance result whose compliance rate is equal to or greater than the threshold value in the information acquired in step ST22, the presentation mode determining unit 205 determines, as the presentation mode for presenting the second road sign information, a mode whose presentation is further emphasized by one more level from the presentation mode with the highest compliance rate.

For example, when the threshold value of the compliance rate at the time of determination of the presentation mode is set to equal to or greater than 95% in the presentation mode determining unit 205, in the example of FIG. 2, the compliance rate with respect to the road sign is less than 95% in any information of No. 1 to No. 3, and there is no compliance result whose compliance rate is equal to or greater than the threshold value. The presentation mode determining unit 205 determines, as the presentation mode for presenting the second road sign information, a presentation mode "display the road sign on the display, and output the voice and the attention information in language Y from the speaker" whose presentation is further emphasized by one more level from the presentation mode "display the road sign on the display, output the voice in language Y from the speaker" of the information of No. 3 whose compliance rate is the highest 90%, in the information of No. 1 to No. 3.

It is assumed that a presentation mode for presenting road sign information is set for each presentation strength in the presentation mode determining unit 205.

FIG. 8 is a diagram illustrating an example of a presentation mode set in the presentation mode determining unit 205 of the server device 200 for implementing the information presentation method according to the first embodiment.

In the presentation mode determining unit 205, as a presentation mode of the road sign information of level 1, "Display Road Sign" is set.

In the presentation mode determining unit 205, as a presentation mode of the road sign information of level 2, "Display Road Sign and Text description" is set.

In the presentation mode determining unit 205, as a presentation mode of the road sign information of level 3, "Display Road Sign, Output Voice from Speaker" is set.

In the presentation mode determining unit 205, as a presentation mode of the road sign information of level 4, "Display Road Sign, Output Voice and Attention Information from Speaker" is set.

In the presentation mode determining unit 205, as a presentation mode of the road sign information of level 5, "Display Road Sign, Output Voice and Alarm Sound from Speaker" is set.

The "Output Attention Information" illustrated in the presentation mode of the road sign information of the level 4 in the example of the presentation mode of FIG. 8 will be described. In the presentation mode of the road sign information of the level 4, the road sign is presented on the display, and the voice and the attention information are output from the speaker. For example, it is assumed that there is a road sign in a country y that means "no stop" being very similar to a road sign that means "stop" in the country x. Further, when a driver who speaks in language Y of the country y often misunderstands the "stop" road sign in the country x, attention information for alerting the misunderstanding is output in language Y. In addition, the attention information for alerting may be presented in text description.

As described above, according to the first embodiment, the following steps are included: receiving a captured image of a road sign captured from a first vehicle and information indicating a vehicle situation of the first vehicle, by a communication unit 201; generating first road sign information by recognizing the road sign included in the captured image, by a sign recognizing unit 203; generating first classification information with reference to the information indicating the vehicle situation of the first vehicle, by a classification unit 204; determining a presentation mode of the first road sign information, on a basis of the first road sign information and the first classification information, by a presentation mode determining unit 205; performing control to present the first road sign information in the presentation mode determined in the determining, by a presentation control unit 202; performing determination whether or not the first vehicle performed traveling in compliance with the road sign, and accumulating a determination result of the determination, the first road sign information, the first classification information, and the presentation mode of the first road sign information in association with each other, by a sign compliance determining unit 207; receiving a captured image of a road sign captured from a second vehicle succeeding the first vehicle in time series and information indicating a vehicle situation of the second vehicle, by the communication unit 201; generating second road sign information by recognizing the road sign included in the captured image captured from the second vehicle, by the sign recognizing unit 203; generating second classification information with reference to the information indicating the vehicle situation of the second vehicle, by the classification unit 204; determining, by the presentation mode determining unit 205, a presentation mode different from the presentation mode of the first road sign information, as a presentation mode of the second road sign information, when the determination result indicates that traveling in compliance with the road sign was not performed, the determination result being associated with a set of the first road sign information and the first classification information that coincides with a set of the second road sign information and the second classification information; and performing control to present the second road sign information in the determined presentation mode of the second road sign information, by the presentation control unit 202. Thus, information indicating a traffic rule meant by the road sign can be presented to a driver in an effective presentation mode. In addition, it is possible to assist a driver who does not know what the road sign means, or a driver who has overlooked the road sign.

In addition, according to the first embodiment, the following steps are included: receiving a voice recognition result obtained by recognizing voice in the first vehicle or the second vehicle as the information indicating the vehicle situation, by the communication unit 201; generating the first classification information or the second classification information, by the classification unit 204, by identifying a language used in conversation by an occupant of the first vehicle or the second vehicle with reference to the voice recognition result received, and classifying the vehicle situation of the first vehicle or the second vehicle, on a basis of the language identified; and determining a presentation mode of presenting road sign information in the language identified, when traveling in compliance with the road sign was not performed in the past, by the presentation mode determining unit 205. As a result, it is possible to cope with misidentification of a road sign and lack of understanding of a road sign caused by a difference in the system between countries when a driver drives in a country different from one's own country. For example, it is possible to cope with a case where there is the road sign in the country y that means "no stop" being very similar to the road sign that means "stop" in the country x, and the driver who speaks in language Y of the country y often misunderstands the "stop" road sign in the country x. In addition, information on road signs can be presented in the language in which the driver makes conversation, so that information can be presented effectively.

Note that, in the first embodiment described above, a configuration is described in which the classification unit 204 of the server device 200 identifies the language used for conversation by occupants of a vehicle; however, the language used for conversation by the occupant may be identified in the vehicle-mounted device 100 side. In that case, the vehicle-mounted device 100 transmits the identified language to the server device 200.

Second Embodiment

In this second embodiment, a configuration will be described in which the classification unit 204 generates conversation information as classification information.

Since an information presentation system of the second embodiment has the same configuration as the information presentation system according to the first embodiment illustrated in FIG. 1, illustration of the block diagram is omitted.

Similarly to the first embodiment, the classification unit 204 classifies the vehicle situation, on the basis of the information indicating the vehicle situation. In the second embodiment, the classification unit 204 generates conversation information indicating the presence or absence of conversation in the second vehicle as the second classification information. The classification unit 204 outputs the generated second classification information, that is, second conversation information to the presentation control unit 202.

The classification unit 204 analyzes the voice recognition result in the information indicating the vehicle situation, and recognizes the presence or absence of the conversation in the vehicle. For example, the classification unit 204 classifies the situation in the vehicle into "conversation is present" and "conversation is absent", thereby generating second classification information. In addition, the classification unit 204 may recognize the situation of the conversation, such as recognizing the frequency of conversation, without limiting the classification of the situation in the vehicle to two categories, "conversation is present" and "conversation is absent". When recognizing the frequency of conversation, the classification unit 204 finely classifies the situation of the conversation in accordance with the recognized frequency of conversation.

The presentation mode determining unit 205 refers to the information accumulated in the accumulating unit 208, and identifies a set of the first road sign information and the first classification information (first conversation information) that coincides with a set of the second road sign information and the second classification information (second conversation information). The presentation mode determining unit 205 refers to the compliance result associated with the identified set of the first road sign information and the first classification information (first conversation information), and determines a presentation mode of the second road sign information.

Similarly to the first embodiment, the accumulating unit 208 accumulates information including, for example, classification information, presented road sign information, a presentation mode of the road sign information, a compliance rate with respect to the road sign information, and the like.

FIG. 9 is a diagram illustrating an accumulation example in the accumulating unit 208 of the server device 200 for implementing an information presentation method according to the second embodiment.

The accumulating unit 208 accumulates information including, for example, classification information, presented road sign information, a presentation mode of the road sign information, a compliance rate with respect to the road sign, and the like.

In the example of FIG. 9, information of No. 1 indicates that the classification information is "Conversation is Absent", the presented road sign information is "Stop", the presentation mode of the road sign information is "Display Road Sign on Display", and the compliance rate with respect to the road sign is "95%".

Information of No. 2 indicates that the classification information is "Conversation is Present", the presented road sign information is "Stop", the presentation mode of the road sign information is "Display Road Sign on Display" and the compliance rate with respect to the road sign is "75%". Information of No. 3 indicates that the classification information is "Conversation is Present", the presented road sign information is "Stop", the presentation mode of the road sign information is "Display Road Sign on Display, and Output Voice in Language Y from Speaker", and the compliance rate with respect to the road sign is "90%".

When the classification unit 204 classifies the situation into "Conversation is Present", the attention of the driver may be often distracted. In such a case, in addition to displaying the road sign on the display, by outputting the road sign information from the speaker 107 by voice, the road sign information can be effectively presented to the driver. On the other hand, in many cases, when the classification unit 204 classifies the situation into "conversation is absent", the driver concentrates on driving, and the road sign can be effectively presented to the driver only by displaying the road sign on the display 106.

Next, operation will be described in a case where the classification unit 204 generates the second conversation information (hereinafter referred to as second classification information (conversation information)) as the second classification information.

Operation of the entire information presentation system according to the second embodiment is the same as that of the flowchart illustrated in FIG. 5 of the first embodiment.

In step ST7 of the flowchart of FIG. 5, the classification unit 204 recognizes the presence or absence of conversation in the second vehicle and generates the second classification information (conversation information). In addition, in step ST10, the presentation mode determining unit 205 refers to the accumulating unit 208, and identifies a set of the first road sign information and the first classification information that coincides with a set of the second road sign information and the second classification information (conversation information) input from the presentation control unit 202. In step ST11, the presentation mode determining unit 205 refers to the accumulating unit 208, and acquires the compliance result associated with the identified set of the first road sign information and the first classification information.

Specifically, the presentation mode determining unit 205 acquires, from the accumulating unit 208, the compliance result of the case when the first road sign information is presented to the driver of the first vehicle who makes the conversation.

Details of the processing from step ST10 to step ST12 in the flowchart illustrated in FIG. 5 are the same as those of the flowchart illustrated in FIG. 6 of the first embodiment.

As step ST21 of the flowchart of FIG. 6, the presentation mode determining unit 205 refers to the compliance result accumulated in the accumulating unit 208, and determines whether or not there is a set of the first road sign information and the first classification information in which the same road sign information as the second road sign information input from the presentation control unit 202 is presented and in which the same conversation information as the second classification information (conversation information) input from the presentation control unit 202 is included.

Accumulation processing of the compliance result of the information presentation system for implementing the information presentation method according to the second embodiment is the same as that of the flowchart illustrated in FIG. 7 of the first embodiment.

As step ST33 of the flowchart of FIG. 7, the accumulation control unit 206 acquires, from the presentation control unit 202, the first classification information that is immediately preceding conversation information of the first vehicle corresponding to the vehicle-mounted device 100, the first road sign information, and the presentation mode of the first road sign information.

As described above, according to the second embodiment, the following steps are included: generating the first classification information or the second classification information, by the classification unit 204, by recognizing a situation of conversation of an occupant of the first vehicle or the second vehicle with reference to the voice recognition result received, and classifying the vehicle situation of the first vehicle or the second vehicle, on a basis of the situation of the conversation recognized. As a result, the road sign information can be effectively presented to the driver depending on the conversation situation in the vehicle.

Third Embodiment

In this third embodiment, a configuration will be described in which reaction of a driver is accumulated after road sign information is presented, and the accumulated reaction is reflected in determination of a presentation mode of the next road sign information.

Figure 10:
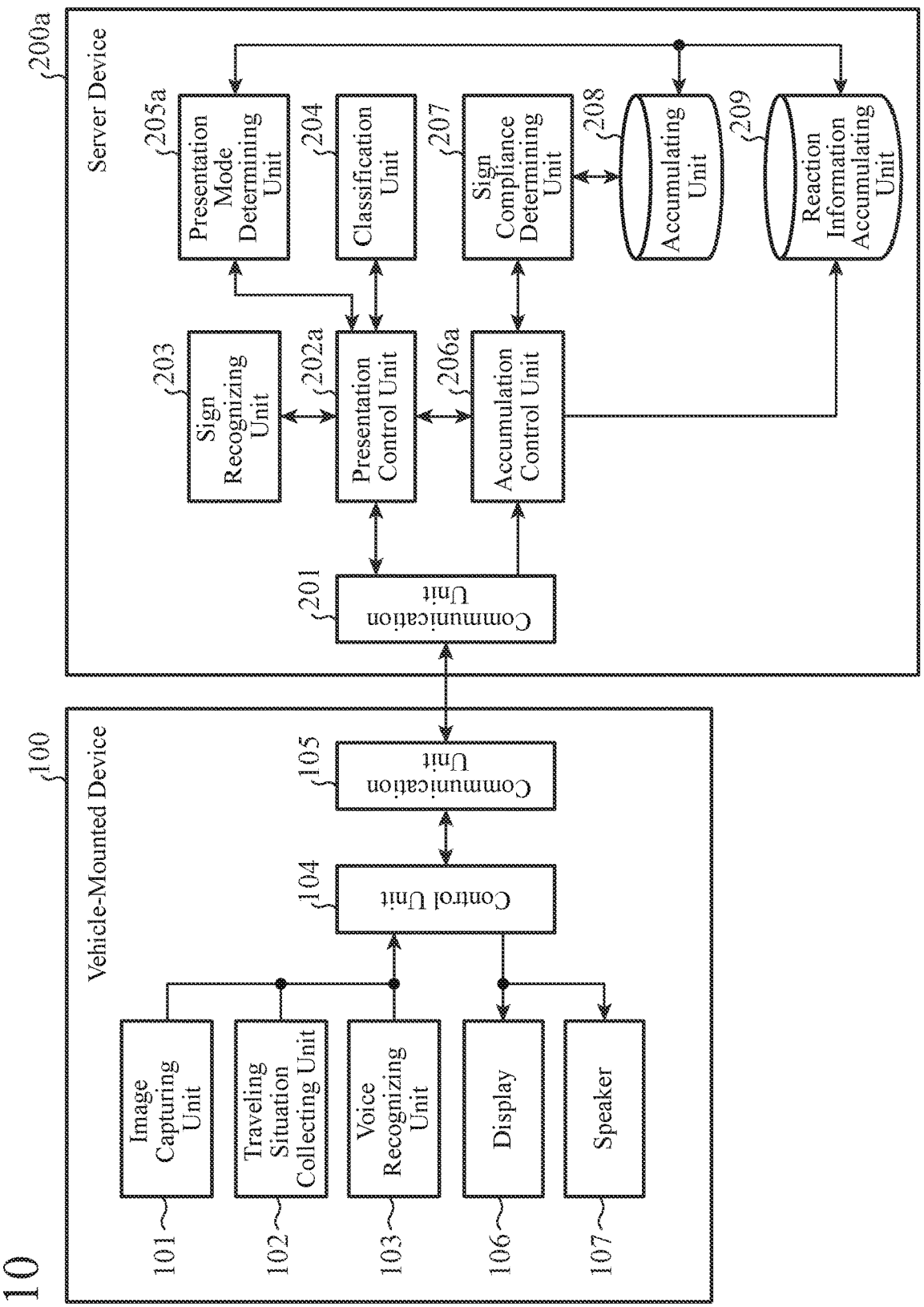
FIG. 10 is a block diagram illustrating a configuration of an information presentation system for implementing an information presentation method according to a third embodiment.

FIG. 10 is a block diagram illustrating a configuration of an information presentation system for implementing an information presentation method according to the third embodiment. In a server device 200a of the third embodiment, a reaction information accumulating unit 209 is additionally provided to the server device 200 described in the first embodiment. In addition, instead of the presentation control unit 202, the presentation mode determining unit 205, and the accumulation control unit 206 of the server device 200 described in the first embodiment, a presentation control unit 202a, a presentation mode determining unit 205a, and an accumulation control unit 206a are provided.

Hereinafter, the same portions as or corresponding portions to those of the information presentation system according to the first embodiment are denoted by the same reference numerals as those used in the first embodiment, and the description thereof will be omitted or simplified.

In addition to the processing described in the first embodiment, the accumulation control unit 206a also performs the processing described below. The accumulation control unit 206a acquires a voice recognition result transmitted from the vehicle-mounted device 100 via the communication unit 201. The accumulation control unit 206a extracts a voice recognition result indicating discomfort of the driver from the acquired voice recognition result. The accumulation control unit 206a extracts, as the voice recognition result indicating discomfort of the driver, for example, words indicating complaints such as "noisy", sound of tutting, or the like. The accumulation control unit 206a acquires, from the presentation control unit 202a, the first road sign information presented when the voice recognition result indicating discomfort of the driver is extracted and the presentation mode of the first road sign information, and accumulates them as reaction information in the reaction information accumulating unit 209.

In a case where the reaction information that the driver showed discomfort when the same road sign information is presented in the same presentation mode, which is information indicating discomfort of the driver, has already been accumulated in the reaction information accumulating unit 209, the accumulation control unit 206a only performs update of the rate at which the driver showed discomfort. On the other hand, in a case where the reaction information that the driver shownned discomfort when the same road sign information is presented in the same presentation mode has not been accumulated in the reaction information accumulating unit 209, new reaction information is created.

The accumulation control unit 206a may accumulate the information in the reaction information accumulating unit 209 by integrating the reaction information of a plurality of vehicles, or may accumulate the information in the reaction information accumulating unit 209 to manage reaction information of each vehicle individually.

FIG. 11A is a diagram illustrating an accumulation example in the reaction information accumulating unit 209 of the server device 200a for implementing the information presentation method according to the third embodiment.

The reaction information accumulating unit 209 accumulates, for example, the presented road sign information, the presentation mode (presentation level) of the road sign information when the driver showed discomfort, and the rate at which the driver showed discomfort.

The example of FIG. 11A indicates that when "display the road sign on the display, and output the voice from the speaker" of the road sign information "stop" is performed, the rate at which the driver showed discomfort is "30%".

The presentation mode determining unit 205a determines the presentation mode of the second road sign information with reference to the accumulating unit 208, on the basis of the second road sign information and the second classification information of the second vehicle similarly to the first embodiment. Further, when the presentation mode determining unit 205*a* refers to the reaction information accumulating unit 209, and presents the same road sign information as the second road sign information in the same presentation mode as that of the second road sign information, if the rate at which the driver showed discomfort is equal to or greater than a preset threshold value (for example, equal to or greater than 30%), the presentation mode determining unit 205*a* performs processing of lowering the level of the presentation mode of the determined second road sign information.

When the presentation mode of the second road sign information determined in advance is level 4 (see FIG. 8 of the first embodiment), for example, the presentation mode determining unit 205*a* performs processing of lowering the presentation mode to that of level 3, or level 2, as the processing for lowering the level of the presentation mode. In the presentation mode, as the level becomes higher, output of attention information or alarm sound, blinking on the display, or the like is added, and the road sign information to be presented becomes easy to be recognized by the driver, but some people may feel that the presentation in that presentation mode is excessive. The reaction of the driver is accumulated in the reaction information accumulating unit 209, whereby it is possible to suppress repetition of the presentation mode in which the driver felt that the presentation in the presentation mode is excessive in the past.

Besides the above-described configuration, the reaction of the driver for each vehicle may be accumulated individually. In this case, for each vehicle, the accumulation control unit 206*a* may acquire the first road sign information that was presented when the voice recognition result indicating discomfort of the driver is extracted, and the presentation mode of the first road sign information, and after adding information for identifying the first vehicle to the acquired information, accumulate the acquired information in the reaction information accumulating unit 209. The information for identifying the first vehicle is an ID number or the like of the vehicle transmitted from the vehicle-mounted device 100 side. When transmitting the voice recognition result to the server device 200*a*, the vehicle-mounted device 100 adds the ID number to the voice recognition result and performs the transmission. An example in a case where the reaction information for each vehicle is accumulated individually in the reaction information accumulating unit 209 is illustrated in FIG. 11B.

FIG. 11B is a diagram illustrating an accumulation example in the reaction information accumulating unit 209 of the server device 200*a* for implementing the information presentation method according to the third embodiment, and illustrates a case where the reaction information is accumulated for each vehicle individually.

The reaction information accumulating unit 209 accumulates, for example, the vehicle ID, the presented road sign information, and the presentation mode (presentation level) of the road sign information when the driver showed discomfort. The example of FIG. 11B indicates that in the vehicle with the vehicle ID "1011", when "display the road sign on the display, and output the voice from the speaker" of the road sign information "stop" is performed, the driver showed discomfort.

In the case of the example of FIG. 11B, similarly, the presentation mode determining unit 205*a* determines the presentation mode of the second road sign information with reference to the accumulating unit 208, on the basis of the second road sign information and the second classification information of the second vehicle similarly to the first embodiment. Further, the presentation mode determining unit 205*a* performs a search in the reaction information accumulating unit 209 with reference to the information for identifying the second vehicle transmitted from the vehicle-mounted device 100 side. If information showing that discomfort was shown when the same road sign information as the second road sign information is presented in the same presentation mode as that of the second road sign information is accumulated for the second vehicle in the reaction information accumulating unit 209, the presentation mode determining unit 205*a* performs processing of lowering the level of the presentation mode of the determined second road sign information.

Next, a hardware configuration example of the server device 200*a* will be described.

Since diagrams each illustrating a hardware configuration example of the server device 200*a* are the same as those in FIGS. 4A and 4B described in the first embodiment, illustration thereof is omitted.

In addition, functions of the presentation control unit 202*a*, the presentation mode determining unit 205*a*, and the accumulation control unit 206*a* of the server device 200*a* are similar to those of the presentation control unit 202, the presentation mode determining unit 205, and the accumulation control unit 206 described in the first embodiment.

Next, operation of the information presentation system will be described.

Figure 12:
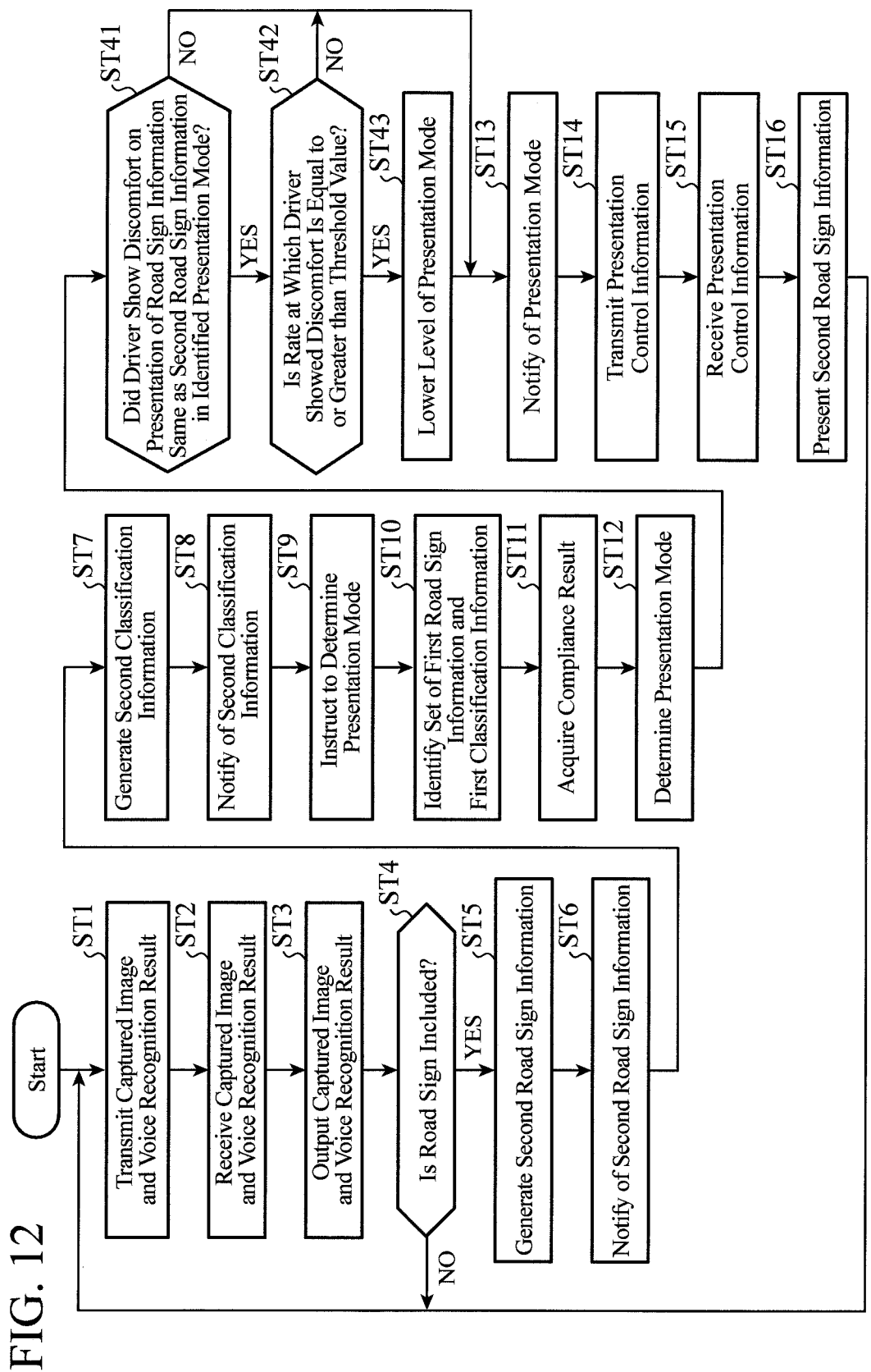
FIG. 12 is a flowchart illustrating operation of presentation processing of road sign information of the information presentation system for implementing the information presentation method according to the third embodiment.

FIG. 12 is a flowchart illustrating operation of presentation processing of road sign information of the information presentation system for implementing the information presentation method according to the third embodiment.

FIG. 12 illustrates a case where the reaction information accumulating unit 209 accumulates the information illustrated in FIG. 11A and the presentation mode of the second road sign information is determined in accordance with the rate at which the driver showed discomfort. Hereinafter, the same steps as those of the vehicle-mounted device 100 and the server device 200 according to the first embodiment are denoted by the same reference numerals as those used in FIG. 5, and the description thereof will be omitted or simplified.

When the presentation mode determining unit 205*a* determines the presentation mode of the second road sign information in step ST12, with reference to the reaction information accumulating unit 209, the presentation mode determining unit 205*a* performs a search for whether or not the driver showed discomfort in a case where the same road sign information as the second road sign information generated in step ST5 is presented in the presentation mode determined in step ST12 (step ST41). When the driver showed discomfort (step ST41; YES), the presentation mode determining unit 205*a* determines whether or not the rate at which the driver has shown discomfort is equal to or greater than the preset threshold value (step ST42).

When the rate at which the driver showed discomfort is equal to or greater than the preset threshold value (step ST42; YES), the presentation mode determining unit 205*a* performs processing of lowering the level of the presentation mode of the second road sign information determined in step ST12 (step ST43). Thereafter, the processing of the flowchart proceeds to the processing in step ST13. On the other hand, when the driver did not show discomfort (step ST41; NO), or when the rate at which the driver showed discomfort is less than the threshold value (step ST42; NO), the processing proceeds to step ST13.

As described above, according to the third embodiment, the following steps are included: receiving a voice recognition result obtained by recognizing voice in the first vehicle when road sign information is presented, by the communication unit 201; extracting a voice recognition result indicating that a driver of the first vehicle showed discomfort, from the voice recognition result received by the accumulation control unit 206a, generating and accumulating, by the accumulation control unit 206a, reaction information in which the extracted voice recognition result, the first road sign information presented, and the presentation mode of the first road sign information are associated with each other, and reducing strength of presenting the second road sign information in a case where the driver showed discomfort at the time when the first road sign information is presented in the past, by the presentation mode determining unit. As a result, in a case where the driver showed discomfort to the presentation of the road sign information in the past, it is possible to suppress presentation of the road sign information in the similar presentation mode again.

Note that, in the third embodiment described above, a case where the presentation control unit 202a, the presentation mode determining unit 205a, and the reaction information accumulating unit 209 are used in the server device 200 described in the first embodiment is shown; however, the configuration may be used in the server device 200 described in the second embodiment.

Fourth Embodiment

In this fourth embodiment, a configuration for reflecting a viewing state of a driver on determination of a presentation mode of road sign information will be described.

Figure 13:
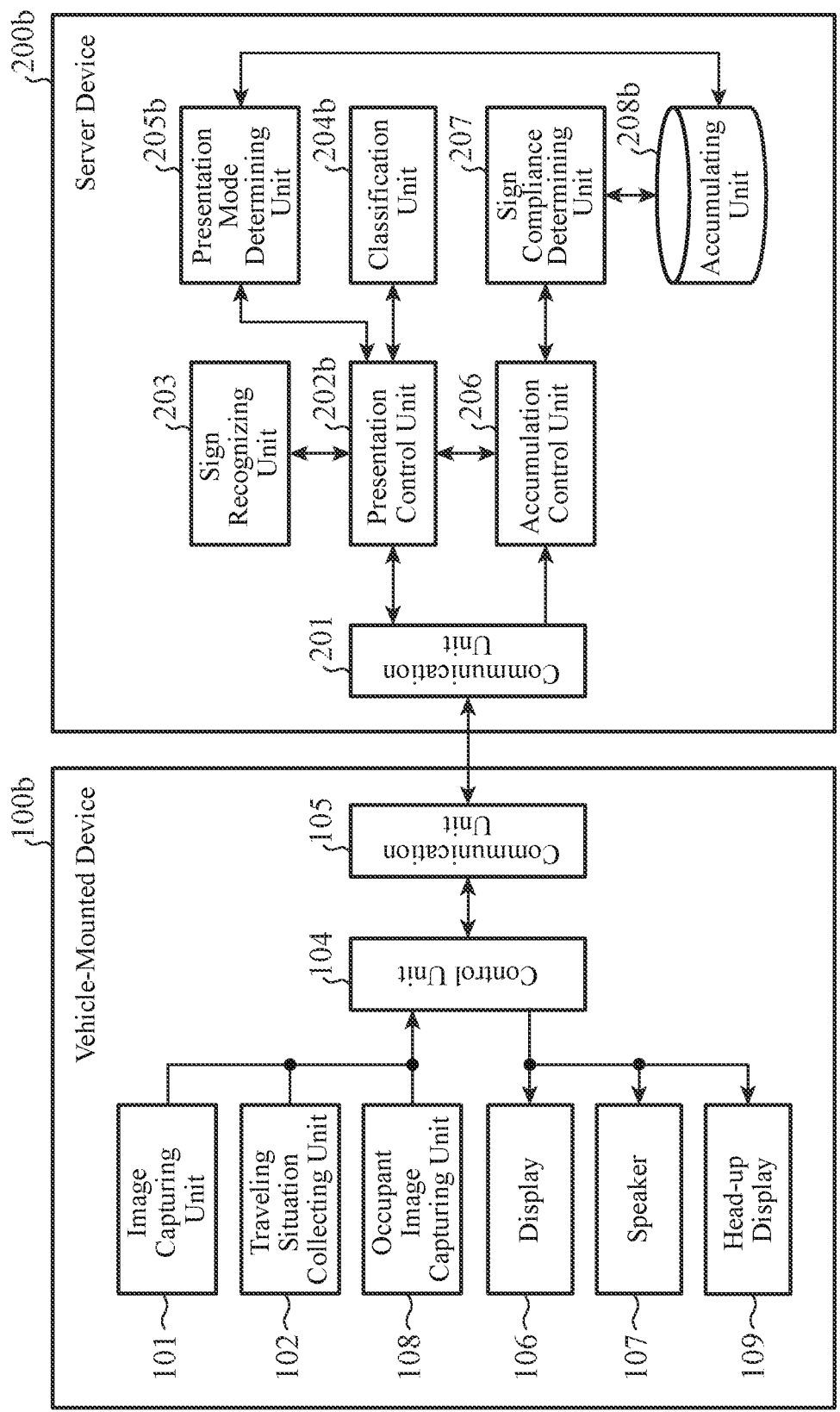
FIG. 13 is a block diagram illustrating a configuration of an information presentation system for implementing an information presentation method according to a fourth embodiment.

FIG. 13 is a block diagram illustrating a configuration of an information presentation system for implementing an information presentation method according to the fourth embodiment. A vehicle-mounted device 100b of the fourth embodiment is provided with an occupant image capturing unit 108 instead of the voice recognizing unit 103 of the vehicle-mounted device 100 described in the first embodiment. In addition, the vehicle-mounted device 100b includes a head-up display (HUD) 109.

A server device 200b of the fourth embodiment includes a presentation control unit 202b, a classification unit 204b, a presentation mode determining unit 205b, and an accumulating unit 208b, instead of the presentation control unit 202, the classification unit 204, the presentation mode determining unit 205, and the accumulating unit 208 of the server device 200 described in the first embodiment.

Hereinafter, the same portions as or corresponding portions to those of the information presentation system according to the first embodiment are denoted by the same reference numerals as those used in the first embodiment, and the description thereof will be omitted or simplified.

The occupant image capturing unit 108 captures an image of a driver of a host vehicle mounting the vehicle-mounted device 100b. The occupant image capturing unit 108 detects a situation of the driver from a captured image of the driver. The situation of the driver detected by the occupant image capturing unit 108 is, for example, a line-of-sight direction of the driver, a direction of the face of the driver, or the like. The head-up display 109 presents second road sign information transmitted from the server device 200b in a specified presentation mode. The vehicle-mounted device 100b includes the head-up display 109 in addition to the display 106, and a plurality of displays is included.

The display 106 is, for example, a main display of a navigation device. The head-up display 109 is implemented, for example, by projecting an image on a windshield on which the image is reflected, and is a display on which information provided along with a real scenery during traveling can be recognized. The control unit 104 performs control for switching an output destination of the second road sign information to the head-up display 109 or the display 106 on the basis of control information transmitted from the server device 200b.

The presentation control unit 202b of the server device 200b acquires, as information indicating a vehicle situation, a captured image captured by the image capturing unit 101 and information indicating the situation of the driver detected by the occupant image capturing unit 108 from the vehicle-mounted device 100b side via the communication unit 201. The presentation control unit 202b performs control for generating the second road sign information on the basis of the acquired information, and performs control for presenting the generated second road sign information to the vehicle-mounted device 100b.

The classification unit 204b classifies the vehicle situation with reference to the information indicating the situation of the driver input from the presentation control unit 202b. In the fourth embodiment, the classification unit 204b performs identification of a viewing direction of the driver as a classification of the vehicle situation, thereby generating second viewing information as second classification information. The classification unit 204b outputs the generated second classification information, that is, the second viewing information to the presentation control unit 202b. The presentation mode determining unit 205b determines, with reference to a compliance result accumulated in the accumulating unit 208b indicating whether or not traveling according to a road sign was performed in the past, a presentation mode of the second road sign information, on the basis of the second road sign information and the second viewing information input from the presentation control unit 202b.

Specifically, the presentation mode determining unit 205b acquires a past compliance result in a case where the same road sign information as the second road sign information generated by the sign recognizing unit 203 is presented to the driver viewing the viewing direction indicated in the second viewing information that is the second classification information. The presentation mode determining unit 205b determines the presentation mode of the second road sign information on the basis of the acquired past compliance result.

Similarly to the first embodiment, the accumulating unit 208b accumulates a compliance result acquired from a first vehicle, first road sign information, and a presentation mode of the first road sign information.

FIG. 14 is a diagram illustrating an accumulation example in the accumulating unit 208b of the server device 200b for implementing the information presentation method according to the fourth embodiment.

Similarly to the first embodiment, the accumulating unit 208b accumulates information including classification information, presented road sign information, a presentation mode of the road sign information, a compliance rate with respect to the road sign, and the like. As the classification information, viewing information of the driver is accumulated.

In the example of FIG. 14, information of No. 1 indicates that the classification information is "View Left Side with Respect to Traveling Direction Ahead of Vehicle", the presented road sign information is "Stop", the presentation mode of the road sign information is "Display Road Sign on Main Display", and the compliance rate with respect to the road sign is "80%". Information of No. 2 indicates that the classification information is "View Left Side with Respect to Traveling Direction Ahead of Vehicle", the presented road sign information is "Stop", the presentation mode of the road sign information is "Display on Display Located in Viewing Direction", and the compliance rate with respect to the road sign is "90%". When the presentation mode determining unit 205b determines the presentation mode of the second road sign information on the basis of the information of No. 2, the control unit 104 of the vehicle-mounted device 100b becomes possible to perform control to cause the head-up display 109 located in the viewing direction of the driver to display the second road sign information.

The presentation mode determining unit 205b refers to the accumulating unit 208b on the basis of the viewing information of the driver as illustrated in FIG. 14, thereby being able to effectively present the road sign information to the driver. Note that, in a case where there is no display located in the line-of-sight direction of the driver, the control unit 104 of the vehicle-mounted device 100b can appropriately perform setting, for example, to output the road sign information by voice with the speaker 107, or the like. Thus, the information presentation system can present the road sign information in accordance with the viewing information of the driver.

Next, hardware configuration examples of the vehicle-mounted device 100b and the server device 200b will be described.

Since diagrams each illustrating a hardware configuration example of the vehicle-mounted device 100b are the same as those in FIGS. 3A and 3B described in the first embodiment, illustrations thereof are omitted. Similarly, since diagrams each illustrating a hardware configuration example of the server device 200b are the same as those in FIGS. 4A and 4B described in the first embodiment, illustrations thereof are omitted.

The function of the occupant image capturing unit 108 of the vehicle-mounted device 100b is similar to that of the image capturing unit 101, and the function of the head-up display 109 is similar to that of the display 106. In addition, functions of the presentation control unit 202b, the classification unit 204b, and the presentation mode determining unit 205b of the server device 200b are similar to those of the presentation control unit 202, the classification unit 204, and the presentation mode determining unit 205 described in the first embodiment.

Next, operation of the information presentation system will be described.

Figure 15:
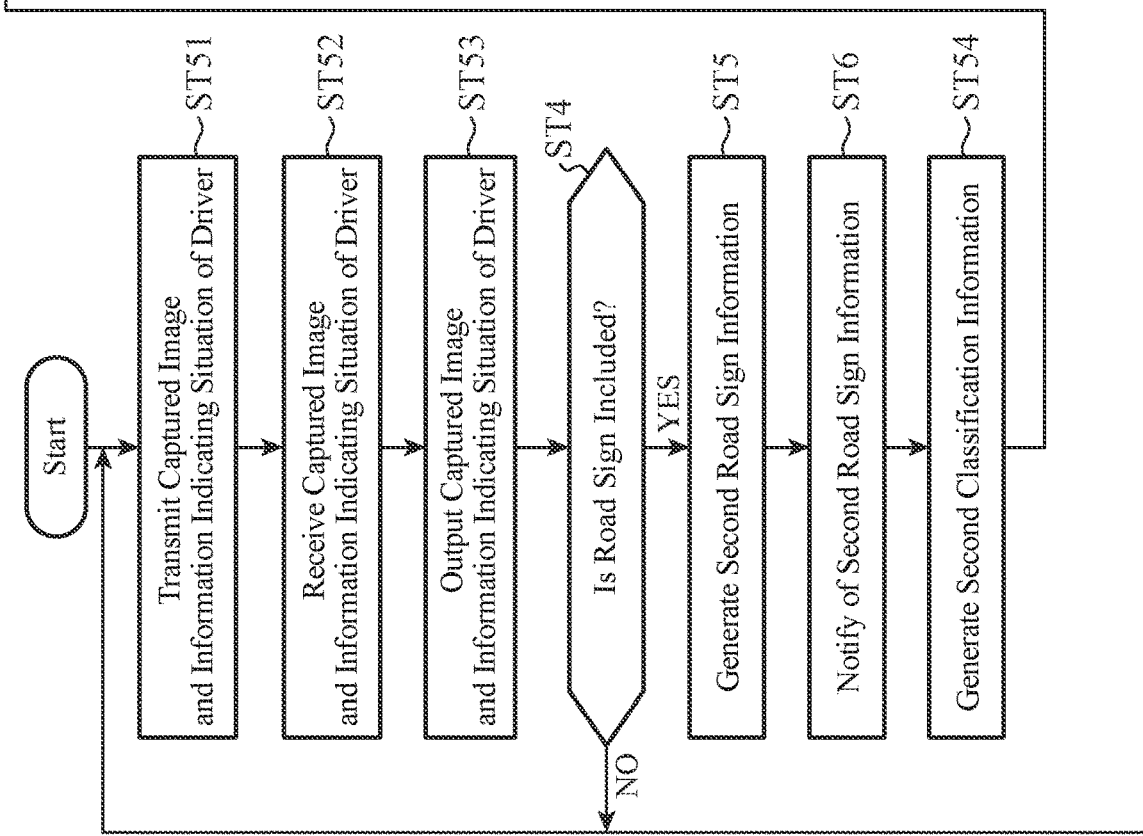
FIG. 15 is a flowchart illustrating operation of presentation processing of road sign information of the information presentation system for implementing the information presentation method according to the fourth embodiment.

FIG. 15 is a flowchart illustrating operation of presentation processing of road sign information of the information presentation system for implementing the information presentation method according to the fourth embodiment. Hereinafter, the same steps as those of the vehicle-mounted device 100 and the server device 200 according to the first embodiment are denoted by the same reference numerals as those used in FIG. 5, and the description thereof will be omitted or simplified.

The control unit 104 of the vehicle-mounted device 100b acquires the captured image of the image capturing unit 101 and the information indicating the situation of the driver detected by the occupant image capturing unit 108, and transmits the acquired image and information to the server device 200b via the communication unit 105 (step ST51).

The communication unit 201 of the server device 200b receives the captured image and the information indicating the situation of the driver which are transmitted from the vehicle-mounted device 100b, and outputs them to the presentation control unit 202b (step ST52). The presentation control unit 202b outputs the captured image input in step ST52 to the sign recognizing unit 203, and outputs the information indicating the situation of the driver to the classification unit 204b (step ST53). Thereafter, the processing from step ST4 to step ST6 is performed.

Next, the classification unit 204b classifies the situation of the vehicle with reference to the information indicating the situation of the driver input in step ST53, thereby generating the second classification information (step ST54). Specifically, by identifying the viewing direction of the driver, the classification unit 204b generates the second viewing information as the second classification information (hereinafter referred to as second classification information (viewing information)). The classification unit 204b notifies the presentation control unit 202b of the second classification information generated in step ST54 (step ST8). Note that, the processing in step ST54 and step ST8 may be performed in parallel with the processing from step ST4 to step ST6.

The presentation control unit 202b outputs the second road sign information notified from the sign recognizing unit 203 and the second classification information notified from the classification unit 204b to the presentation mode determining unit 205b, and instructs the presentation mode determining unit 205b to determine the presentation mode of the second road sign information (step ST9). The presentation mode determining unit 205b identifies, with reference to the accumulating unit 208b, a set of the first road sign information and the first classification information that coincides with a set of the second road sign information and the second classification information input from the presentation control unit 202b (step ST10). The presentation mode determining unit 205b acquires, with reference to the accumulating unit 208b, a compliance result associated with the identified set of the first road sign information and the first classification information (step ST11).

For example, the presentation mode determining unit 205b acquires, from the accumulating unit 208b, the compliance result in a case where the first road sign information is presented to the driver of the first vehicle viewing the viewing direction indicated in the viewing information input from the presentation control unit 202b.

Thereafter, the processing from step ST12 to step ST15 is performed. On the basis of the control information, the control unit 104 of the vehicle-mounted device 100b performs processing of presenting the second road sign information to the driver via at least one of the display 106, the head-up display 109, and the speaker 107 (step ST55). Thereafter, the processing of the flowchart returns to the processing in step ST51, and the above-described processing is repeated.

Details of the processing from step ST10 to step ST12 in the flowchart illustrated in FIG. 15 are the same as those in the flowchart illustrated in FIG. 6 of the first embodiment.

As step ST21 of the flowchart of FIG. 6, the presentation mode determining unit 205 determines, with reference to the compliance result accumulated in the accumulating unit 208b, whether or not there is a set of the first road sign information and the first classification information that coincides with a set of the second road sign information and the second classification information (viewing information) input from the presentation control unit 202b.

Accumulation processing of the compliance result in the information presentation method according to the fourth embodiment is the same as that of the flowchart illustrated in FIG. 7 of the first embodiment.

As step ST33 of the flowchart of FIG. 7, the accumulation control unit 206 acquires, from the presentation control unit 202b, the first classification information that is immediately preceding viewing information of the first vehicle corresponding to the vehicle-mounted device 100, the first road sign information, and the presentation mode of the first road sign information.

In addition to the above-described processing, the occupant image capturing unit 108 may determine whether or not the driver is driving with keeping his/her eyes on the road on the basis of the detected direction of the face of the driver. When it is determined that the driver is driving without keeping his/her eyes on the road, the occupant image capturing unit 108 adds information indicating that the driving without keeping one's eyes on the road is performed as the situation of the driver. When the information indicating that driving without keeping one's eyes on the road is performed is added to the information indicating the situation of the driver, the classification unit 204b describes that the driving without keeping one's eyes on the road is performed also in the second classification information (viewing information) to be generated.

When it is described that the driving without keeping one's eyes on the road is performed in the second classification information (viewing information), the presentation mode determining unit 205b does not determine the presentation mode in which displaying is performed on the display located in the viewing direction. For example, when it is described that the driving without keeping one's eyes on the road is performed in the second classification information (viewing information), the presentation mode determining unit 205b determines the presentation mode for performing display on the predetermined main display, or performing display on the predetermined main display and voice output from the speaker.

Thus, the presentation mode determining unit 205b can suppress the occurrence of the situation that the driver gazes at the road sign information displayed in a direction in which the driver is looking aside, and reduce a risk that the driver cannot return one's line-of-sight to the front of the vehicle. In addition, the presentation mode determining unit 205b can emphasize the presentation of the road sign information by voice output or the like.

Further, in addition to the above-described processing, the occupant image capturing unit 108 may further detect facial expression of the driver, an opening state of eyes of the driver, and the like, as the situation of the driver. From a detection result of the occupant image capturing unit 108, the classification unit 204b may identify whether the driver is sleeping, whether the driver is laughing, whether the driver is angry, and the like, and adds these pieces of information to the viewing information.

The presentation mode determining unit 205b determines the presentation mode of the second road sign information, on the basis of the second road sign information and the viewing direction of the driver that is included in the second classification information (viewing information). Thereafter, when information indicating that the driver is sleeping is included in the second classification information (viewing information), the presentation mode determining unit 205b changes the determined presentation mode of the second road sign information. For example, the presentation mode determining unit 205b changes the presentation mode to that of the highest level 5 in the presentation level of the first embodiment illustrated in FIG. 8.

Similarly, when information indicating that the driver is laughing is included in the second classification information (viewing information), the presentation mode determining unit 205b maintains the determined presentation mode of the second road sign information. Further, when information indicating that the driver is angry is included in the second classification information (viewing information), the presentation mode determining unit 205b makes a change to lower the level of the determined presentation mode of the second road sign information.

In addition, the presentation mode determining unit 205b may generate the second classification information (viewing information) by identifying only whether the driver is sleeping, whether the driver is laughing, whether the driver is angry, and the like, without performing the identification of the viewing direction of the driver.

Further, the configuration described in the third embodiment, in which the reaction of the driver is accumulated and reflected on next time determination of the presentation mode of the road sign information, may be applied to the information presentation system of the fourth embodiment.

The accumulation control unit 206 extracts facial expression showing discomfort of the driver such as being angry or frowning, from the facial expression of the driver, the degree of eye-opening of the driver, and the like detected by the occupant image capturing unit 108. The accumulation control unit 206 accumulates, in the reaction information accumulating unit 209 illustrated in the block diagram of FIG. 10, the extracted result of the facial expression showing discomfort of the driver, together with the first road sign information and the presentation mode of the first road sign information when the extraction result is obtained.

The presentation mode determining unit 205b determines the presentation mode of the second road sign information with reference to the accumulating unit 208b, and then performs a search for whether or not the driver has shown discomfort in the past with reference to the reaction information accumulating unit 209. Note that, since processing operation of referring to the reaction information accumulating unit 209 is the same as that in the third embodiment, the detailed description thereof will be omitted.

In addition, also in a case where a result is obtained that, as the reaction of the driver, the facial expression is not changed after the first road sign information is presented, and traveling in compliance with the road sign is performed, the accumulation control unit 206 may accumulate the reaction in the reaction information accumulating unit 209. In such a case, the presentation mode determining unit 205b can be configured so that the next time presentation mode of the road sign information becomes a simpler one for the same driver.

Further, when the driver has already viewed a road sign before the second road sign information is presented, the presentation mode determining unit 205b may be configured so that the display for presenting the second road sign information is not changed on the basis of the second classification information (viewing direction). Further, in this case, the presentation mode determining unit 205b may be configured to stop voice output of the second road sign information, or to change the presentation mode of the second road sign information to be simpler one.

Specifically, the classification unit 204b determines whether or not the driver is viewing a road sign by comparing the position of the road sign on an image captured by the image capturing unit 101 with a line-of-sight direction obtained from an image captured by the occupant image capturing unit 108 at the same time as the time when the image capturing unit 101 captured the image.

When the driver of the vehicle has already viewed the road sign before the second road sign information is presented, the presentation mode determining unit 205b displays the second road sign information only on the display 106 that is the main display. Alternatively, the presentation mode determining unit 205b selects simpler means as a presentation mode of the second road sign information, for example, a presentation mode of the level 1 or level 2 in FIG. 8 of the first embodiment.

Thus, it is possible to suppress excessive information presentation for the road sign that has already been viewed by the driver.

As described above, according to the fourth embodiment, the following steps are included: receiving information indicating a situation of a driver of the first vehicle or the second vehicle as the information indicating the vehicle situation, by the communication unit 201, generating the first classification information or the second classification information, by the classification unit 204b, by identifying a viewing direction of the driver of the first vehicle or the second vehicle with reference to the received information indicating the situation of the driver of the first vehicle or the second vehicle, and by classifying the vehicle situation of the first vehicle or the second vehicle, on a basis of the viewing direction identified, and changing a presentation position of the road sign information, on a basis of the viewing direction identified, by the presentation mode determining unit 205b, when traveling in compliance with a road sign was not performed in the past. As a result, the road sign information can be presented on the display arranged in the viewing direction of the driver, and a possibility that the driver recognizes the road sign information can be improved.

In addition, according to the fourth embodiment, the following step is included: adding presentation by voice output to the presentation mode of the second road sign information, on a basis of the viewing direction identified, by the presentation mode determining unit 205b. As a result, when the driver is driving without keeping hit/her eyes on the road, the presentation of the road sign information can be emphasized by the voice output.

In addition, according to the fourth embodiment, the following step is included: reducing strength of presenting the second road sign information in a case where the reaction information when the first road sign information was presented is not accumulated and traveling in compliance with the road sign was performed in past, by the presentation mode determining unit 205b. As a result, the next time presentation mode of the road sign information can be changed to a simpler one when the driver drives in compliance with the road sign with his/her normal mind.

In addition, according to the fourth embodiment, the following step is included: reducing strength of presenting the second road sign information when the driver of the second vehicle viewed the road sign before the second road sign information is presented, by the presentation mode determining unit 205b. As a result, it is possible to suppress excessive information presentation for the road sign that has already been viewed by the driver.

Fifth Embodiment

In this fifth embodiment, a configuration, in which classification information is generated on the basis of information indicating a driving skill level in occupant information in information indicating a vehicle situation, will be described.

Figure 16:
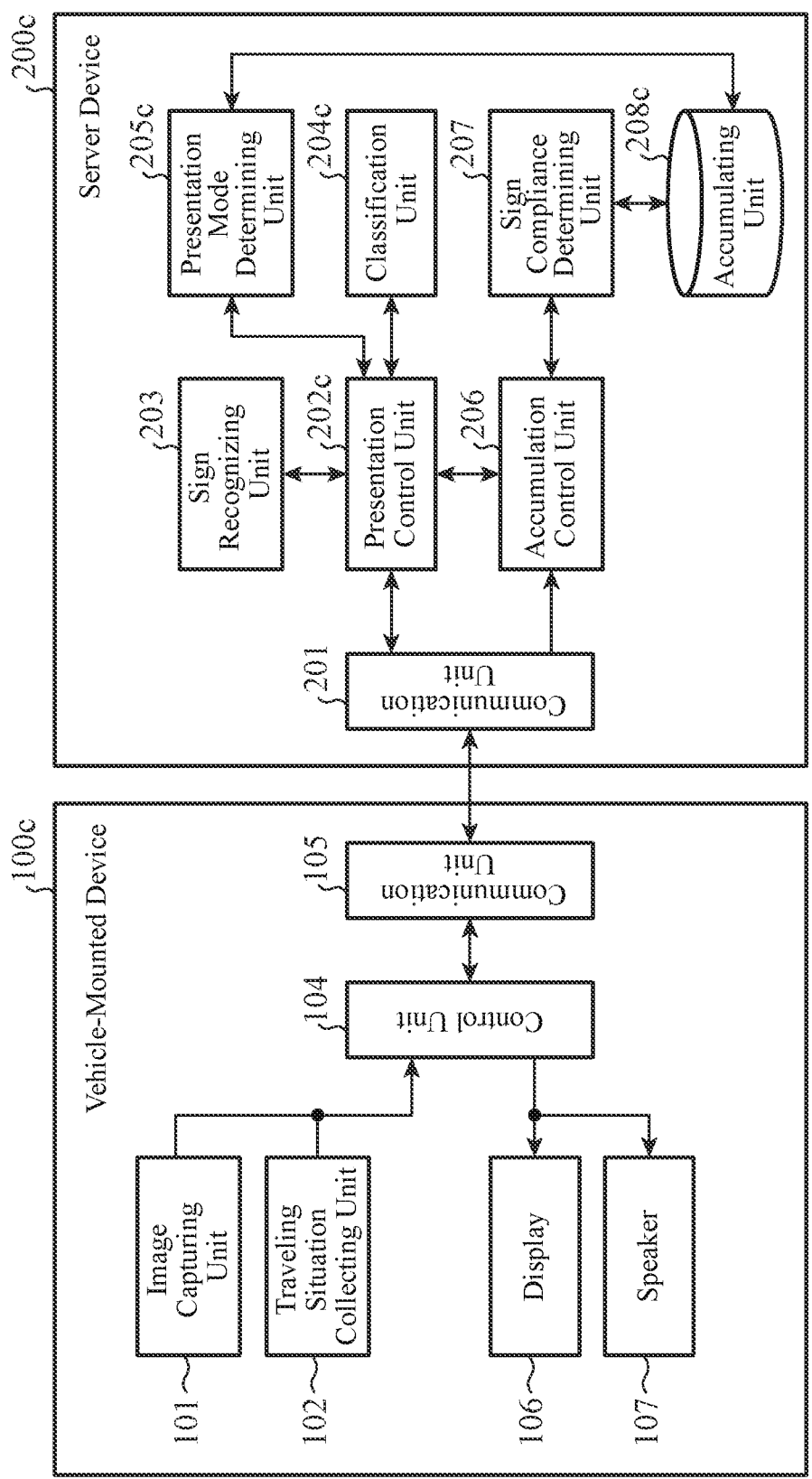
FIG. 16 is a block diagram illustrating a configuration of an information presentation system for implementing an information presentation method according to a fifth embodiment.

FIG. 16 is a block diagram illustrating a configuration of an information presentation system for implementing an information presentation method according to the fifth embodiment.

A vehicle-mounted device 100c of the fifth embodiment does not include the voice recognizing unit 103 of the vehicle-mounted device 100 described in the first embodiment.

A server device 200c of the fifth embodiment includes a presentation control unit 202c, a classification unit 204c, a presentation mode determining unit 205c, and an accumulating unit 208c, instead of the presentation control unit 202, the classification unit 204, the presentation mode determining unit 205, and the accumulating unit 208 of the server device 200 described in the first embodiment.

Hereinafter, the same components portions as or corresponding portions to those of the information presentation system according to the first embodiment are denoted by the same reference numerals as those used in the first embodiment, and the description thereof will be omitted or simplified.

The presentation control unit 202c of the server device 200c acquires a captured image and driving skill level information of a driver that is information indicating the vehicle situation, from the vehicle-mounted device 100c side via the communication unit 201. The presentation control unit 202c performs control for generating second road sign information on the basis of the acquired information, and performs control for presenting the generated second road sign information to the vehicle-mounted device 100c.

The classification unit 204c classifies the vehicle situation with reference to the information indicating the vehicle situation input from the presentation control unit 202c. In the fifth embodiment, the classification unit 204c classifies the vehicle situation of a second vehicle and generates second classification information on the basis of a driving skill level of a driver of the second vehicle that is the vehicle situation of the second vehicle. The classification unit 204c generates the second classification information which indicates, for example, "driving skill level: low", "driving skill level: high", or the like, on the basis of the driving skill level of the driver.

The driving skill level of the driver is set on the basis of an experience of the driver estimated by analyzing a traveling speed, a steering wheel operation state, a brake operation state, and the like of the vehicle, for example. The driving skill level of the driver may be input by the driver as a numerical value indicating the driving experience, and be set in accordance with the input numerical value.

The classification unit 204c outputs the second classification information generated on the basis of the above-described driving skill level of the driver to the presentation control unit 202c.

The presentation mode determining unit 205c, with reference to information accumulated in the accumulating unit 208c, identifies a set of first road sign information and first classification information that coincides with a set of the second road sign information and the second classification information. The presentation mode determining unit 205c, with reference to a compliance result associated with the identified set of the first road sign information and the first classification information, determines a presentation mode of the second road sign information. Here, when a rate of a first vehicle traveling in compliance with the first road sign is less than a threshold value, the presentation mode determining unit 205c changes the presentation mode of the second road sign information to a presentation mode different from a presentation mode of the first road sign information.

Similarly to the first embodiment, the accumulating unit 208c accumulates a determination result of the sign compliance determining unit 207, and the presentation mode of the first road sign information which are acquired from the first vehicle.

FIG. 17 is a diagram illustrating an accumulation example of the accumulating unit 208c of the information presentation system for implementing the information presentation method according to the fifth embodiment.

The accumulating unit 208c accumulates information including, for example, classification information, presented road sign information, a presentation mode of the road sign information, a compliance rate with respect to the road sign, and the like. The accumulating unit 208c accumulates the compliance result with the road sign in accordance with the driving skill level of the driver.

In the example of FIG. 17, information of No. 1 indicates that the classification information is "Driving Skill Level: Low", the presented road sign information is "Stop", the presentation mode of the road sign information is "Display Road Sign", and the compliance rate with respect to the road sign is "70%".

Information of No. 2 indicates that the classification information is "Driving Skill Level: Low", the presented road sign information is "Stop", the presentation mode of the road sign information is "Display Road Sign, Output Voice from Speaker", and the compliance rate with respect to the road sign is "90%".

Information of No. 3 indicates that the classification information is "Driving Skill Level: Low", the presented road sign information is "Stop", the presentation mode of the road sign information is "Display Road Sign, Output Voice and Alarm Sound from Speaker", and the compliance rate with respect to the road sign is "98%".

Information of No. 4 indicates that the classification information is "Driving Skill Level: High", the presented road sign information is "Stop", the presentation mode of the road sign information is "Display Road Sign", and the compliance rate with respect to the road sign is "95%".

It is assumed that, in the presentation mode determining unit 205c, the threshold value of the compliance rate used for extracting the information set when the classification information is "Driving Skill Level: Low" is 75%. In the example of FIG. 17, the presentation mode determining unit 205c extracts the information of No. 2 (compliance rate "90%") and the information of No. 3 (compliance rate "98%") whose classification information is "Driving Skill Level: Low" and whose compliance rate is equal to or greater than 75%. The presentation mode determining unit 205c compares the extracted presentation mode of the information of No. 2 with the presentation mode of the information of No. 3, and determines that the presentation mode of only the voice is easier, thereby selecting the information of No. 2.

Next, hardware configuration examples of the vehicle-mounted device 100c and the server device 200c will be described.

Since diagrams illustrating hardware configuration examples of the vehicle-mounted device 100c and the server device 200c are the same as those in FIGS. 3A and 3B and FIGS. 4A and 4B described in the first embodiment, illustration thereof is omitted.

Functions of the presentation control unit 202c, the classification unit 204c, and the presentation mode determining unit 205c of the server device 200c are similar to those of the presentation control unit 202, the classification unit 204 and the presentation mode determining unit 205 described in the first embodiment.

Next, operation of the information presentation system will be described.

Figure 18:
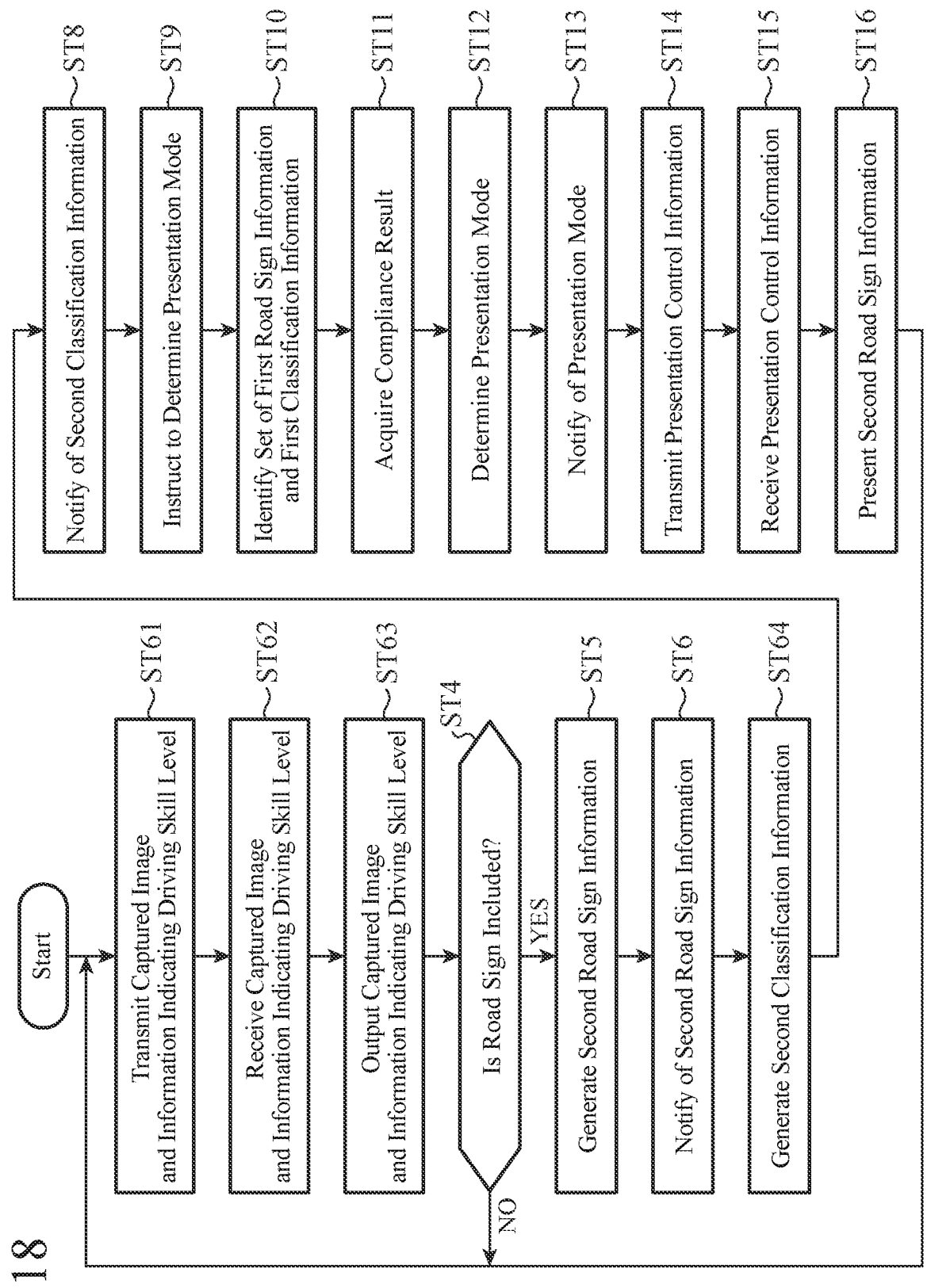
FIG. 18 is a flowchart illustrating operation of presentation processing of road sign information of the information presentation system for implementing the information presentation method according to the fifth embodiment.

FIG. 18 is a flowchart illustrating operation of presentation processing of road sign information of the information presentation system for implementing the information presentation method according to the fifth embodiment. Hereinafter, the same steps as those of the vehicle-mounted device 100 and the server device 200 according to the first embodiment are denoted by the same reference numerals as those used in FIG. 5, and the description thereof will be omitted or simplified.

The control unit 104 of the vehicle-mounted device 100c acquires the captured image of the image capturing unit 101 and the information indicating the driving skill level of the driver collected by the traveling situation collecting unit 102, and transmits them to the server device 200 via the communication unit 105 (step ST61). The communication unit 201 of the server device 200 receives the captured image and the information indicating the driving skill level of the driver, which are transmitted from the vehicle-mounted device 100c, and outputs them to the presentation control unit 202c (step ST62). The presentation control unit 202c outputs the captured image input in step ST62 to the sign recognizing unit 203, and outputs the information indicating the driving skill level of the driver input in step ST62 to the classification unit 204c (step ST63). Thereafter, the processing from step ST4 to step ST6 is performed.

Next, the classification unit 204c classifies the driving skill level with reference to the information indicating the driving skill level of the driver input in step ST63, thereby generating the second driving skill level information as the second classification information (hereinafter, referred to as second classification information (driving skill level information)) (step ST64). Thereafter, the processing from step ST8 to step ST16 is performed.

Details of the processing from step ST10 to step ST12 in the flowchart illustrated in FIG. 18 are the same as those in the flowchart illustrated in FIG. 6 of the first embodiment.

As step ST21 of the flowchart of FIG. 6, the presentation mode determining unit 205c, with reference to the compliance result accumulated in the accumulating unit 208c, determines whether or not there is a set of the first road sign information and the first classification information that coincides with a set of the second road sign information and the second classification information (driving skill level information) input from the presentation control unit 202c.

Accumulation processing of the compliance result in the information presentation method according to the fifth embodiment is the same as that of the flowchart illustrated in FIG. 7 of the first embodiment.

As step ST33 of the flowchart of FIG. 7, the accumulation control unit 206 acquires, from the presentation control unit 202c, the first classification information that is information indicating the driving skill level of the driver, the first road sign information, and the presentation mode of the first road sign information regarding the first vehicle corresponding to the vehicle-mounted device 100c.

Since when drivers have the same driving skill level, the levels of comprehension of the road sign of the respectibve drivers are considered to be the same, in the fifth embodiment, the presentation method of the road sign information is changed in accordance with the driving skill level. When a driver having a certain driving skill level cannot understand a sign, it is highly likely that a driver having the same driving skill level cannot understand similarly, and in that case, it is possible to present the road sign information more intelligibly to make the driver understand the road sign.

As described above, in the invention according to the fifth embodiment further includes: receiving a traveling situation of a vehicle as information indicating the vehicle situation of the first vehicle or the second vehicle, by the communication unit 201, and generating classification information, by the classification unit 204c, by classifying the vehicle situation of the first vehicle or the second vehicle, on a basis of a driving skill level of a driver of the first vehicle or the second vehicle estimated from the traveling situation of the first vehicle or the second vehicle received. As a result, the road sign information can be presented in accordance with the driving skill level of the driver.

Note that, in the fifth embodiment described above, a configuration in which the driving skill level of the driver is used as the information indicating the vehicle situation is described; however, driving characteristics of the driver may be used as the information indicating the vehicle situation.

The classification unit 204c estimates driving characteristics of the driver by analyzing the traveling speed, the steering wheel operation state, the brake operation state, and the like collected by the traveling situation collecting unit 102, thereby generating second driving characteristic information as the second classification information. The classification unit 204c classifies the driving characteristics of the driver as "performing impatient and rough driving", "traveling in safe driving", and the like, on the basis of the estimated driving characteristics of the driver. Note that, the driving characteristics of the driver may be estimated by the vehicle-mounted device 100c, and the estimation result may be transmitted to the server device 200c.

By using the driving characteristic of the driver as the information indicating the vehicle situation, the information presentation system can present the information in a presentation mode suitable for the driving characteristics of each driver. As a result, it is possible to present information in accordance with characteristics of the driver such that, for example, when the information presentation system presents information of "Stop", it is necessary to present information using voice for a driver performing rough driving, while it is not necessary to present information using voice for a driver performing safe driving in which temporary stop is regularly performed.

Note that, in the first to third embodiments described above, a configuration in which the voice recognizing unit 103 of the vehicle-mounted device 100 performs the voice recognition processing is described. Alternatively, the voice recognition processing may be performed by the server devices 200 and 200a.

Note that, in the first to fifth embodiments described above, a configuration in which the processing for recognizing the road sign is performed by the server devices 200, 200a, 200b, and 200c is described. Alternatively, the processing for recognizing the road sign may be performed by the vehicle-mounted device 100, 100b, 100c.

Besides the above, in the present invention, within the scope of the invention, the embodiments can be freely combined, any component of each embodiment can be modified or omitted.

INDUSTRIAL APPLICABILITY

Since in the information presentation method according to the present invention, it is possible to present an appropriate amount of information of road signs in accordance with states of a driver, the method can be applied to a navigation device or the like, and effective presentation of navigation information can be implemented.

REFERENCE SIGNS LIST

100, 100b, 100c: Vehicle-mounted device, 101: Image capturing unit, 102: Traveling situation collecting unit, 103: Voice recognizing unit, 104: Control unit, 105, 201: Communication unit, 106: Display, 107: Speaker, 108: Occupant image capturing unit, 109: Head-up display, 200, 200a, 200b, 200c: Server device, 202, 202b, 202c: Presentation control unit, 203: Sign recognizing unit, 204, 204b, 204c: Classification unit, 205, 205a, 205b, 205c: Presentation mode determining unit, 206, 206a: Accumulation control unit, 207: Sign compliance determining unit, 208, 208b, 208c: Accumulating unit, 209: Reaction information accumulating unit.

The invention claimed is:

1. An information presentation method comprising:
   receiving a captured image of a road sign captured from a first vehicle and information indicating a vehicle situation of the first vehicle;
   generating first road sign information by recognizing the road sign included in the captured image;
   generating first classification information with reference to the information indicating the vehicle situation of the first vehicle;
   determining a presentation mode of the first road sign information, on a basis of the first road sign information and the first classification information;
   performing control to present the first road sign information in the presentation mode determined in the determining;
   performing determination whether or not the first vehicle performed traveling in compliance with the road sign, and accumulating a determination result of the determination, the first road sign information, the first classification information, and the presentation mode of the first road sign information in association with each other;
   receiving a captured image of a road sign captured from a second vehicle succeeding the first vehicle in time series and information indicating a vehicle situation of the second vehicle;
   generating second road sign information by recognizing the road sign included in the captured image captured from the second vehicle;
   generating second classification information with reference to the information indicating the vehicle situation of the second vehicle;
   determining a presentation mode different from the presentation mode of the first road sign information, as a presentation mode of the second road sign information, when the determination result indicates that traveling in compliance with the road sign was not performed, the determination result being associated with a set of the first road sign information and the first classification information that coincides with a set of the second road sign information and the second classification information; and
   performing control to present the second road sign information in the determined presentation mode of the second road sign information.

2. The information presentation method according to claim 1, further comprising:

receiving a voice recognition result obtained by recognizing voice in the first vehicle or the second vehicle as the information indicating the vehicle situation.

3. The information presentation method according to claim 2, further comprising:

generating the first classification information or the second classification information by identifying a language used in conversation by an occupant of the first vehicle or the second vehicle with reference to the voice recognition result received, and classifying the vehicle situation of the first vehicle or the second vehicle, on a basis of the language identified.

4. The information presentation method according to claim 3, further comprising:

determining a presentation mode of presenting the second road sign information in the language identified, when the determination result indicates that traveling in compliance with the road sign was performed.

5. The information presentation method according to claim 2, further comprising:

generating the first classification information or the second classification information by recognizing a situation of conversation of an occupant of the first vehicle or the second vehicle with reference to the voice recognition result received, and classifying the vehicle situation of the first vehicle or the second vehicle, on a basis of the situation of the conversation recognized.

6. The information presentation method according to claim 2, further comprising:

receiving a voice recognition result obtained by recognizing voice in the first vehicle when the first road sign information is presented; and extracting a voice recognition result indicating that a driver of the first vehicle showed discomfort, from the voice recognition result received, and generating and accumulating reaction information in which the first road sign information presented when the voice recognition result is extracted and the presentation mode of the first road sign information are associated with each other.

7. The information presentation method according to claim 6, further comprising:

reducing strength of presenting the second road sign information in a case where the reaction information when the first road sign information is presented is accumulated.

8. The information presentation method according to claim 1, further comprising:

receiving information indicating a situation of a driver of the first vehicle or the second vehicle as the information indicating the vehicle situation.

9. The information presentation method according to claim 8, further comprising:

generating the first classification information or the second classification information by identifying a viewing direction of the driver of the first vehicle or the second vehicle with reference to the information indicating the situation of the driver of the first vehicle or the second vehicle received, and by classifying the vehicle situation of the first vehicle or the second vehicle, on a basis of the viewing direction identified.

10. The information presentation method according to claim 9, further comprising, changing a presentation position of the second road sign information, on a basis of the viewing direction of the driver of the second vehicle identified when the first vehicle did not perform traveling in compliance with a road sign in the past.

11. The information presentation method according to claim 9, further comprising:

adding presentation by voice output to the presentation mode of the second road sign information, on a basis of the viewing direction of the driver of the second vehicle identified.

12. The information presentation method according to claim 9, further comprising:

reducing strength of presenting the second road sign information when the driver of the second vehicle viewed the road sign before the second road sign information is presented.

13. The information presentation method according to claim 8, further comprising receiving a captured image of the driver of the first vehicle when the first road sign information is presented; and extracting a facial expression of the driver of the first vehicle showing discomfort, from the captured image received, and generating and accumulating reaction information by associating the first road sign information presented when the facial expression is extracted with the presentation mode of the first road sign information.

14. The information presentation method according to claim 13, further comprising:

reducing strength of presenting the second road sign information in a case where the reaction information when the first road sign information was presented is accumulated.

15. The information presentation method according to claim 13, further comprising:

reducing strength of presenting the second road sign information in a case where the reaction information when the first road sign information was presented is not accumulated and traveling in compliance with the road sign was performed in past in the first vehicle.

16. The information presentation method according to claim 1, further comprising:

receiving a traveling situation of the first vehicle or the second vehicle as information indicating the vehicle situation.

17. The information presentation method according to claim 16, further comprising:

generating the first classification information or the second classification information by classifying the vehicle situation of the first vehicle or the second vehicle, on a basis of a driving skill level of a driver of the first vehicle or the second vehicle estimated from the traveling situation of the first vehicle or the second vehicle received.

18. The information presentation method according to claim 16, further comprising:

generating the first classification information or the second classification information by classifying the vehicle situation of the first vehicle or the second vehicle, on a basis of a driving characteristic of a driver of the first vehicle or the second vehicle estimated from the traveling situation of the first vehicle or the second vehicle received.

* * * * *